(12) United States Patent
Kim et al.

(10) Patent No.: US 10,724,918 B2
(45) Date of Patent: Jul. 28, 2020

(54) APPARATUS AND METHOD FOR DETECTING ABNORMAL VIBRATION IN ROTOR

(71) Applicant: DOOSAN HEAVY INDUSTRIES & CONSTRUCTION CO., LTD., Changwon-si, Gyeongsangnam-do (KR)

(72) Inventors: Seongjoon Kim, Seoul (KR); Joonhyuk Choi, Gimhae-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 470 days.

(21) Appl. No.: 15/699,179

(22) Filed: Sep. 8, 2017

(65) Prior Publication Data
US 2018/0067010 A1 Mar. 8, 2018

(30) Foreign Application Priority Data
Sep. 8, 2016 (KR) .......................... 10-2016-0115332

(51) Int. Cl.
*G01H 1/00* (2006.01)
*G01M 1/22* (2006.01)

(52) U.S. Cl.
CPC .............. *G01M 1/22* (2013.01); *G01H 1/003* (2013.01)

(58) Field of Classification Search
CPC ................................. G01H 1/003; G01M 1/22
See application file for complete search history.

(56) References Cited

U.S. PATENT DOCUMENTS 3,220,247 A * 11/1965 Goodman ............... G01M 1/22
  73/648
4,614,117 A * 9/1986 Taniguti ................. F01D 25/04
  340/683

(Continued)

FOREIGN PATENT DOCUMENTS

CN 102022264 A 4/2011
EP 2988104 A2 2/2016

(Continued)

OTHER PUBLICATIONS

A Japanese Notice of Reasons for Rejection dated Jun. 19, 2018 in connection with Japanese Patent Application No. 2017-173407 which corresponds to the above-referenced U.S. application.

(Continued)

*Primary Examiner* — David J Bolduc
(74) *Attorney, Agent, or Firm* — Invenstone Patent, LLC

(57) ABSTRACT

An apparatus for detecting abnormal vibrations of a rotor includes a vibration information receiver configured to receive at least one type of information among vibration information regarding one or more dimensions distinguishing locations and directions of the rotor and rotor rotation information including a number of rotations of the rotor, a multivariate management index calculator configured to calculate multivariate management indexes from the vibration information regarding the one or more dimensions, and an operation index extractor configured to determine an abnormality in vibration characteristics of the rotor when a Hotelling's T-squared value is greater than an upper control limit and extracts an operation index causing the abnormality in the vibration characteristics of the rotor from one or more operation indexes. An abnormal vibration in a rotor is detected based on four-dimensional (4D) vibration information distinguishing locations and directions of the rotor.

18 Claims, 13 Drawing Sheets

(56) References Cited

U.S. PATENT DOCUMENTS

| | | | | |
|---|---|---|---|---|
| 8,136,405 | B2* | 3/2012 | Boetius | G01H 1/003 73/593 |
| 8,222,760 | B2* | 7/2012 | Menke | F03D 7/042 290/44 |
| 8,297,123 | B2* | 10/2012 | Howard | G01H 11/00 73/584 |
| 8,688,246 | B2* | 4/2014 | Fujii | H01L 21/67253 700/21 |
| 8,744,813 | B2* | 6/2014 | Lacaille | G05B 23/0254 703/2 |
| 2006/0000283 | A1* | 1/2006 | Twerdochlib | G01H 1/003 73/593 |
| 2006/0073013 | A1* | 4/2006 | Emigholz | C10G 11/18 416/35 |
| 2006/0074599 | A1* | 4/2006 | Emigholz | C10G 11/187 702/185 |
| 2007/0124113 | A1* | 5/2007 | Foslien | G05B 23/024 702/185 |
| 2008/0082181 | A1* | 4/2008 | Miller | G05B 23/021 700/30 |
| 2009/0078051 | A1* | 3/2009 | Twerdochlib | G01H 1/003 73/660 |
| 2009/0295561 | A1* | 12/2009 | Hu | G05B 19/41875 340/501 |
| 2009/0299695 | A1* | 12/2009 | Subbu | G06F 11/30 702/181 |
| 2009/0300417 | A1* | 12/2009 | Bonissone | G05B 23/0254 714/26 |
| 2010/0138267 | A1 | 6/2010 | Vittal et al. | |
| 2011/0144947 | A1* | 6/2011 | Myougan | F03G 7/04 702/183 |
| 2012/0029838 | A1* | 2/2012 | Hallman | G01H 1/003 702/34 |
| 2012/0136819 | A1* | 5/2012 | Pandey | F02C 9/00 706/14 |
| 2012/0166142 | A1* | 6/2012 | Maeda | G05B 23/0227 702/185 |
| 2013/0207974 | A1 | 8/2013 | Slemp | |
| 2013/0274899 | A1* | 10/2013 | Hamzaoui | G05B 23/0281 700/81 |
| 2014/0238128 | A1* | 8/2014 | Vosejpka | G01M 1/22 73/460 |
| 2015/0292857 | A1* | 10/2015 | Lu | G01B 7/30 324/658 |
| 2015/0356521 | A1* | 12/2015 | Sridhar | G06Q 50/04 705/305 |
| 2016/0054171 | A1* | 2/2016 | Maalouf | F01D 21/003 702/56 |
| 2017/0092021 | A1* | 3/2017 | Nielsen | G05B 23/0283 |
| 2017/0122094 | A1* | 5/2017 | Chugunov | E21B 47/0007 |

FOREIGN PATENT DOCUMENTS

| | | |
|---|---|---|
| JP | 8-334405 A | 12/1996 |
| JP | 2850917 B2 | 1/1999 |
| JP | 3321487 B2 | 9/2002 |
| JP | 2003-149043 A | 5/2003 |
| JP | 2008-298527 A | 12/2008 |
| JP | 2009-70071 A | 4/2009 |
| JP | 2012-118981 A | 6/2012 |
| KR | 20-0335004 Y1 | 12/2003 |
| KR | 10-0954090 B1 | 4/2010 |
| KR | 10-1449457 B1 | 10/2014 |

OTHER PUBLICATIONS

A Chinese Office Action dated Apr. 2, 2019 in connection with Japanese Patent Application No. 201710802379.1 which corresponds to the above-referenced U.S. application.

An extended European search report issued by the European Patent Office dated Jan. 25, 2018 in connection with European patent application No. 17190028.5.

A Korean Office Action dated Nov. 9, 2017 in connection with Korean patent application No. 10-2016-0115332 which corresponds to the above-referenced U.S. application.

Wan-Sup Cheung, "Predictive Diagnosis and Preventive Maintenance Technologies for Dry Vacuum Pumps," Vacuum Magazine, vol. 2, Issue 1, 2015, pp. 31-34, The Korean Vacuum Society.

* cited by examiner

Deceleration section

APPARATUS AND METHOD FOR DETECTING ABNORMAL VIBRATION IN ROTOR

CROSS REFERENCE TO RELATED APPLICATION

The present application claims priority to Korean Patent Application No. 10-2016-0115332, filed Sep. 8, 2016, the entire contents of which is incorporated herein by reference.

BACKGROUND

The present disclosure relates generally to an apparatus and a method for detecting abnormal vibrations of a rotor. More particularly, the present disclosure relates to an apparatus and a method for detecting abnormal vibrations of a rotor based on four-dimensional (4D) vibration information distinguishing locations and directions of the rotor.

Generally, a high speed rotor, such as a turbine of a power plant, is operated in association with a variety of systems. Abnormal vibration in the rotor is an important factor that may cause the power generation of a generator to stop. Therefore, a vibration reference value of the high speed rotor is set in accordance with international codes and by a company that orders the manufacture of the generator.

Stopping of power generation by a high vibration of a rotor of a turbine generator, a type of high speed rotor, causes losses of at least several hundred million Korean won. The high speed rotor is monitored and managed through various methods.

Therefore, there is a need to determine an abnormal vibration in a rotor by measuring, in various locations and directions, rotor vibrations due to the rotation of the rotor and synthesizing measured data.

In addition, it is necessary to determine an abnormal vibration in the rotor using a different method of distinguishing a transient section lasting prior to the rotor rotating in a normal state after initial rotation and a regular section in which the rotor rotates in the normal state.

SUMMARY

In one aspect, an abnormal vibration in a rotor is determined by measuring, in various locations and directions, rotor vibrations due to the rotation of the rotor and synthesizing measured data.

In another aspect, the abnormal vibration in the rotor is determined through other methods of distinguishing a transient section and a regular section, the transient section indicating a section until the rotor rotates in a normal state after initially rotating, and the normal section indicating a section in which the rotor rotates in the normal state.

In yet another aspect, an abnormality in a vibration change is determined according to whether a Hotelling's T-squared value of a peak-to-peak value of a vibration of the rotor exceeds an upper control limit (UCL), when it is determined whether the abnormal vibration in the rotor exists in the regular section.

In still yet another aspect, the abnormal vibration in the rotor is determined through an exploratory analysis, a correlation analysis, and a contribution analysis of a Hotelling's T-squared value over time of a peak-to-peak value of a vibration of the rotor, and a value change over time of other operation elements of a generator.

Meanwhile, technical problems to be solved by the present disclosure are not restricted to the above-mentioned, and any other technical problems not mentioned so far will be clearly appreciated by those skilled in the art based on the following descriptions.

According to one exemplary embodiment, an apparatus for detecting abnormal vibrations of a rotor includes a vibration information receiver receiving at least one type of information among vibration information regarding one or more dimensions by distinguishing locations and directions of the rotor and rotor rotation information including a number of rotations of the rotor, a multivariate management index calculator calculating multivariate management indexes regarding the vibration information regarding the one or more dimensions, and an operation index extractor determining an abnormality in vibration characteristics of the rotor when a Hotelling's T-squared value is greater than an upper control limit and extracting an operation index causing the abnormality in the vibration characteristics of the rotor from one or more operation indexes.

The vibration information regarding the one or more dimensions includes a first peak-to-peak value of a vibration at one end of the rotor with respect to an X-axis direction orthogonal to a line connecting one end and the other end of the rotor, a second peak-to-peak value of a vibration at one end of the rotor with respect to a Y-axis direction orthogonal to the line connecting one end and the other end of the rotor, a third peak-to-peak value of a vibration at the other end of the rotor with respect to the X-axis direction orthogonal to the line connecting one end and the other end of the rotor, and a fourth peak-to-peak value of a vibration at the other end of the rotor with respect to the Y-axis direction orthogonal to the line connecting one end and the other end of the rotor.

The multivariate management index calculator calculates the Hotelling's T-squared value using a deviation between an average value of the first to fourth peak-to-peak values in a specific section and an average value of the first to the fourth peak-to-peak values in an entire time section.

The operation index extractor outputs at least one of the Hotelling's T-squared value, the first to fourth peak-to-peak values, and an operation index value over time on a display unit.

The one or more operation indexes include at least one of a temperature of a thrust bearing pad metal, a temperature of a stator gas, and a voltage, a current, a power factor, an output voltage, and reactive power of a generator.

The operation index extractor extracts the operation index causing the abnormality in the vibration characteristics by comparing correlation analysis coefficients with a reference coefficient, the correlation analysis coefficients being extracted by performing a correlation analysis on the Hotelling's T-squared value and the one or more operation indexes.

The operation index extractor extracts the operation index causing the abnormality in the vibration characteristics from the one or more operation indexes using a residual magnitude between a Hotelling's T-squared value when there are all operation indexes among the one or more operation indexes, and a Hotelling's T-squared value when there are only the remaining operation indexes except for an operation index on which a contribution measurement is to be performed.

The apparatus further includes a peak-to-peak value calculator calculating the first to fourth peak values according to the number of rotations of the rotor.

An abnormal vibration determination unit determines an abnormal vibration in the rotor, when any one of the first to fourth peak-to-peak values exceeds a threshold value.

The operation index extractor extracts correlation analysis coefficients by performing a correlation analysis on the Hotelling's T-squared value and the one or more operation indexes.

According to another exemplary embodiment, a method of detecting abnormal vibrations of a rotor includes receiving at least one type of information among vibration information regarding one or more dimensions distinguishing locations and directions of the rotor and rotor rotation information including a number of rotations of the rotor, calculating multivariate management indexes regarding the vibration information regarding the one or more dimensions, and determining an abnormality in vibration characteristics of the rotor when a Hotelling's T-squared value is greater than an upper control limit and extracting an operation index causing the abnormality in the vibration characteristics of the rotor from one or more operation indexes.

The vibration information regarding the one or more dimensions include, a first peak-to-peak value of a vibration at one end of the rotor with respect to an X-axis direction orthogonal to a line connecting one end and the other end of the rotor, a second peak-to-peak value of a vibration at one end of the rotor with respect to a Y-axis direction orthogonal to the line connecting one end and the other end of the rotor, a third peak-to-peak value of a vibration at the other end of the rotor with respect to the X-axis direction orthogonal to the line connecting one end and the other end of the rotor, and a fourth peak-to-peak value of a vibration at the other end of the rotor with respect to the Y-axis direction orthogonal to the line connecting one end and the other end of the rotor.

In the calculation of the multivariate management indexes, the Hotelling's T-squared value is calculated using a deviation between an average value of the first to fourth peak-to-peak values in a specific section and an average value of the first to the fourth peak-to-peak values in an entire time section.

In the extraction of the operation index, at least one of the Hotelling's T-squared value, the first to fourth peak-to-peak values, and an operation index value over time is displayed on a display unit.

The one or more operation indexes include at least one of a temperature of a thrust bearing pad metal, a temperature of a stator gas, and a voltage, a current, a power factor, an output voltage, and reactive power of a generator.

In the extraction of the operation index, the operation index causing the abnormality in the vibration characteristics is extracted by comparing correlation analysis coefficients with a reference coefficient, the correlation analysis coefficients being extracted by performing a correlation analysis on the Hotelling's T-squared value and the one or more operation indexes.

In the extraction of the operation index, the operation index causing the abnormality in the vibration characteristics is extracted from the one or more operation indexes using a residual magnitude between a Hotelling's T-squared value when there are all operation indexes among the one or more operation indexes, and a Hotelling's T-squared value when there are only the remaining operation indexes except for an operation index on which a contribution measurement is to be performed.

The method further includes calculating the first to fourth peak-to-peak values according to the number of rotations of the rotor.

In the determination of the abnormality, when at least one of the first to fourth peak-to-peak values exceeds a threshold value, it is determined that there is an abnormal vibration in the rotor.

In the extraction of the operation index, correlation analysis coefficients is extracted by performing a correlation analysis on the Hotelling's T-squared value and the one or more operation indexes.

Accordingly, an abnormal vibration in a rotor can be determined by measuring, in various locations and directions, a rotor vibration due to the rotation of the rotor and synthesizing measured data.

The abnormal vibration in the rotor can be determined through other methods of distinguishing a transient section and a regular section, the transient section indicating a section until the rotor rotates in a normal state after an initial rotation, and the normal section indicating a section in which the rotor rotates in the normal state.

An abnormality in a vibration change can be determined according to whether a Hotelling's T-squared value of a peak-to-peak value of a vibration of the rotor exceeds an upper control limit (UCL), when it is determined whether there is the abnormal vibration in the rotor in the regular section.

The abnormal vibration in the rotor can be accurately determined through an exploratory analysis, a correlation analysis, and a contribution analysis of a Hotelling's T-squared value over time of a peak-to-peak value of a vibration of the rotor, and a value change over time of other operation elements of a generator.

Effects obtainable from the present disclosure may be non-limited by the above mentioned effect, and other unmentioned effects can be clearly understood from the following descriptions.

BRIEF DESCRIPTION OF THE DRAWINGS

The above and other features and advantages of the present disclosure will be more clearly understood from the following detailed description when taken in conjunction with the accompanying drawings, in which.

DETAILED DESCRIPTION

Figure 1:
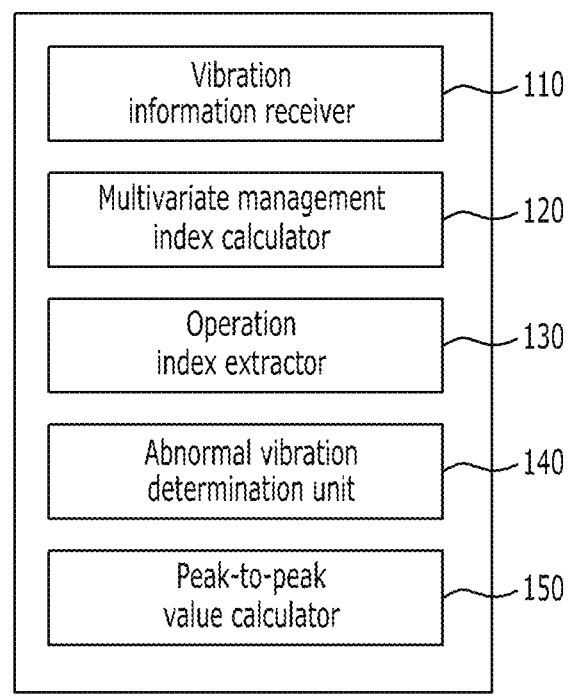
FIG. 1 is an overall configuration diagram illustrating an apparatus for detecting abnormal vibrations of a rotor, according to an exemplary embodiment.

The above and other aspects will be become more apparent from the following description of exemplary embodiments with reference to the accompanying drawings. A variety of combinations of components of the respective embodiments are possible unless explicitly described to the contrary or clearly contradicted by context. The present disclosure may however be embodied in many different forms and should not be construed as being limited to the embodiments set forth herein.

In order to clarify the present disclosure, parts not related to the description are omitted from the drawings, and the same reference numerals are used throughout the drawings to refer to the same or like parts. When it is said that a part "includes" an element, it means that the part may further include other elements unless explicitly described to the contrary.

Throughout the specification, when one part is referred to as being "connected" to another part, not only can it be "directly connected" to the latter, but it can also be "indirectly connected" to the latter via an intervening device. In addition, throughout the specification, a signal means an amount of electric charge, such as a voltage or a current.

The term "part," "section," or "module" used herein means a "block configured to be changeable or pluggable in a hardware or software system," i.e. a single unit or block performing a specific function in hardware or software.

The aforementioned and additional aspects of the present disclosure will become more apparent through exemplary embodiments described with reference to the accompanying drawings.

FIG. 1 is an overall configuration diagram illustrating an apparatus for detecting abnormal vibrations of a rotor, according to an exemplary embodiment.

In an exemplary embodiment, the apparatus for detecting an abnormal vibration in the rotor includes a vibration information receiver 110, a multivariate management index calculator 120, and an operation index extractor 130. The vibration information receiver 110 receives at least one type of information among four-dimensional (4D) vibration information distinguishing the locations and the directions of the rotor included in a generator and rotor rotation information including a number of rotations of the rotor. The aforementioned generator is, for example, a gas turbine generator (GTG).

The aforementioned locations of the rotor include a turbine end (TE) of the rotor and a collector end (CE) of the rotor. The aforementioned directions of the rotor include two axis directions, i.e., an X-axis direction and a Y-axis direction orthogonal to each other. The vibration information regarding the four dimensions includes vibration information on the rotor in an X-axis direction and a Y-axis direction orthogonal to each other at the turbine end of the rotor and vibration information on the rotor in an X-axis direction and a Y-axis direction orthogonal to each other at the collector end of the rotor. The vibration information on the rotor indicates, for example, a peak-to-peak value of a vibration. A unit of the peak-to-peak value is, for example, micrometer (μm), and the number of rotations of the rotor over time is expressed in rotations per minute (RPM).

The vibration information receiver 110 receives an RPM value of the rotor, according to the rotation of the rotor. The vibration information receiver 110 receives peak-to-peak values of a rotor vibration in the X-axis direction and the Y-axis direction orthogonal to each other at the turbine end of the rotor and peak-to-peak values of a rotor vibration in the X-axis direction and the Y-axis direction orthogonal to each other at the collector end of the rotor.

In an exemplary embodiment, the multivariate management index calculator 120 calculates multivariate management indexes including a Hotelling's T-squared value and an upper control limit (UCL) regarding vibration information regarding one or more dimensions. Vibration information on the rotor may be measured with respect to four dimensions by distinguishing the locations and the directions of the rotor, and a correlation between at least two dimensions among the four dimensions may be analyzed. When vibration characteristics with respect to a single dimension are analyzed through a multivariate analysis, an influence due to a combination of vibration information of respective dimensions may be overlooked, a correlation being present between the respective dimensions. Thus, the accurate behavior of vibration information cannot be evaluated.

Accordingly, it is necessary to take into account a correlation between respective axes through a multivariate analysis regarding 4D vibration information (i.e., four axes) of the rotor. It is necessary to apply a management index taking into account the correlation between the respective axes. The management index may be calculated by Equation 1:

$$T^2 \equiv n(\bar{y} - \mu)^T \sum^{-1} (\bar{y} - \mu), \text{ where } \bar{y} = \frac{1}{n}\sum_{i=1}^{n} y_i. \quad (1)$$

When an observed value vector [$y_i$] (where i=1, ..., and n) of a rotor vibration is given, a Hotelling's T-squared value ($T^2$) is calculated by Equation 1. The observed value vector is a peak-to-peak value of a vibration with respect to any one axis among a plurality of axes of the rotor in a subgroup. An n number of $y_i$ may be present in a specific time section, i.e., a subgroup. That is, the peak-to-peak value of the vibration may be measured n times in μm. The calculated $T^2$ is a Hotelling's T-squared value. The Hotelling's $T^2$ is a value for measuring a degree in which an observed value having a multivariate attribute deviates from a center of a fluctuation.

y is a vibration data matrix of the rotor. For example, $y_{ij}$ (where i=1, ..., and n, j=1, ..., and m) is a P-dimensional matrix. The "P" may be four. That is, the "P" is a number of axes, which is a criterion for measuring a vibration of the rotor.

$\bar{y}_i$ is an average value of peak-to-peak values of a vibration in any one subgroup. As described above, $\bar{y}_i$ is a P-dimensional matrix. That is, $\bar{y}_i$ may be a four-dimensional matrix having elements such as a first peak-to-peak value, a second peak-to-peak value, a third peak-to-peak value, and a fourth peak-to-peak value, the first peak-to-peak value being a peak-to-peak value of a vibration at the turbine end of the rotor with respect to an X-axis direction orthogonal to a line connecting one end and the other end of the rotor in any one subgroup, the second peak-to-peak value being a peak-to-peak value of a vibration at the turbine end of the rotor with respect to a Y-axis direction orthogonal to the line connecting one end and the other end of the rotor in any one subgroup, the third peak-to-peak value being a peak-to-peak value of a vibration at the collector end of the rotor with respect to the X-axis direction orthogonal to the line connecting one end and the other end of the rotor in any one subgroup, and the fourth peak-to-peak value being a peak-to-peak value of a vibration at the collector end of the rotor with respect to the Y-axis direction orthogonal to the line connecting one end and the other end of the rotor in any one subgroup.

$\bar{y}_j$ may be calculated by Equation 2:

$$\bar{y}_j = \frac{1}{n}\sum_{i=1}^{n} y_{ij}. \quad (2)$$

The aforementioned "j" is a numeral corresponding to any one subgroup, and the aforementioned "n" is a number of data included in any one subgroup.

A subgroup is a specific time section, for example, one hour. That is, an average value of peak-to-peak values of a vibration with respect to four axes in a subgroup means an average value of peak-to-peak values of a vibration with respect to four axes in a specific time section.

$S_j$ is a covariance matrix and may be calculated by Equation 3:

$$S_j = \frac{1}{n-1}\sum_{i=1}^{n} (\bar{y}_{ij} - \bar{y}_j)(\bar{y}_{ij} - \bar{y}_j)^T. \quad (3)$$

$\bar{\bar{y}}$ is an average value of peak-to-peak values of a vibration in an entire section including all subgroups and may be calculated by Equation 4:

$$\bar{\bar{y}} \equiv \mu = \frac{1}{m}\sum_{j=1}^{m} \bar{y}_j, \quad (4)$$

where the number of subgroups is m.

$\Sigma$ is a pooled covariance matrix and may be calculated by Equation 5:

$$\sum \equiv \bar{S} = \frac{1}{m}\sum_{j=1}^{m} S_j. \quad (5)$$

A Hotelling's $T^2$ statistically follows an F-distribution and thus may be approximately calculated as in Equation 6:

$$T^2 \sim \frac{(m+1)(n-1)p}{m(n-1)+1-p} F(p, m(n-1)+1-p). \quad (6)$$

In Equation 6, m is the number of subgroups, and n is the number of data included in the subgroup. P is the number of axes, which is a criterion for measuring a peak-to-peak value. The "P" may be four.

As a result, the Hotelling's $T^2$ is calculated using a transposed matrix of a deviation, i.e., a difference between an average value of peak-to-peak values of a vibration with respect to four axes in a subgroup and an average value of peak-to-peak values of a vibration with respect to four axes in an entire section. In addition, the Hotelling's $T^2$ is calculated using a covariance matrix of the deviation. That is, the Hotelling's $T^2$ is calculated by multiplying the transposed matrix of the deviation by the covariance matrix of the deviation.

The upper control unit (UCL) is determined by an F-distribution function, the number of data (i.e., the number of peak-to-peak values measured with respect to each axes), a tolerance a, the number of axes P, and the number of subgroups K (obtained by dividing an entire section into subgroups). a is, for example, 0.001, and P is, for example, four.

The upper control limit of the Hotelling's $T^2$ may be calculated with respect to a significance level α through Equation 7:

$$UCL = \frac{(m+1)(n-1)p}{m(n-1)+1-p} F_{1-\alpha}(p, m(n-1)+1-p), \quad (7)$$

where m is the number of subgroups, n is the number of data included in the subgroup, and P is the number of axes.

In an exemplary embodiment, the multivariate management index calculator 120 calculates multivariate management indexes including a Hotelling's $T^2$ and an upper control limit (UCL) regarding 4D vibration information in a regular section in which a rotor speed is constant. The regular section in which the rotor speed is constant means a section in which the rotor is operated at a constant speed after the acceleration of the rotor is completed.

In an exemplary embodiment, the operation index extractor 130 determines an abnormality in vibration characteristics of the rotor when the Hotelling's $T^2$ is greater than the upper control limit (UCL) and extracts an operation index causing the abnormality in vibration characteristics of the rotor from one or more operation indexes. The operation index extractor 130 determines whether there is an abnormality in vibration characteristics of the rotor, and further extracts the operation index causing the abnormality in vibration characteristics of the rotor. The detailed descriptions of the operation index extractor 130 will be provided below.

In an exemplary embodiment, the vibration information regarding the four dimensions along the locations and the directions of the rotor include a first peak-to-peak value, a second peak-to-peak value, a third peak-to-peak value, and a fourth peak-to-peak value. The first peak-to-peak value is a peak-to-peak value of a vibration at one end of the rotor with respect to an X-axis direction orthogonal to a line connecting one end and the other end of the rotor. The second peak-to-peak value is a peak-to-peak value of a vibration at one end of the rotor with respect to a Y-axis direction orthogonal to the line connecting one end and the other end of the rotor. The third peak-to-peak value is a peak-to-peak value of a vibration at the other end of the rotor with respect to the X-axis direction orthogonal to the line connecting one end and the other end of the rotor. The fourth peak-to-peak value is a peak-to-peak value of a vibration at the other end of the rotor with respect to the Y-axis direction orthogonal to the line connecting one end and the other end of the rotor. One end may be the turbine end, and the other end may be the collector end.

According to the present disclosure, vibration information on the rotor may be measured with respect to four dimensions by distinguishing the locations and the directions of the rotor, and a correlation between at least two dimensions among the four dimensions may be analyzed. When vibration characteristics with respect to a single dimension are analyzed through a multivariate analysis, an influence due to a combination of vibration information of respective dimensions may be overlooked, a correlation being present between the respective dimensions. Thus, the accurate behavior of vibration information cannot be evaluated. Therefore, as described above, it is necessary to take into account a correlation between respective axes through a multivariate analysis regarding 4D vibration information (i.e., four axes) of the rotor.

In an exemplary embodiment, the multivariate management index calculator 120 calculates the Hotelling's $T^2$ using a deviation, i.e., a difference between an average value of the first to fourth peak-to-peak values in a specific time section and an average value of the first to fourth peak-to-peak values in an entire time section. The specific time section is, for example, one hour.

As a result, the Hotelling's $T^2$ is calculated using a transposed matrix of the deviation, i.e., the difference between the average value of the peak-to-peak values of the vibration with respect to the four axes in a subgroup and the average value of the peak-to-peak values of the vibration with respect to the four axes in the entire section. In addition, the Hotelling's $T^2$ is calculated using a covariance matrix of the deviation. That is, the Hotelling's $T^2$ is calculated by multiplying the transposed matrix of the deviation by the covariance matrix of the deviation.

In an exemplary embodiment, the operation index extractor 130 outputs at least one of the Hotelling's $T^2$, the first to fourth peak-to-peak values, and an operation index value over time on a display unit. The Hotelling's $T^2$ and the operation index value are output as a numeral value over time. An operation index value at a time in which an abnormal vibration is detected may be confirmed when an operation index value in a time section in which a Hotelling's $T^2$ exceeds an upper control limit (UCL). Therefore, it is possible to extract an operation index causing an abnormal vibration.

In an exemplary embodiment, the operation index includes at least one of a temperature of a thrust bearing pad metal, a temperature of a stator gas, and a voltage, a current, a power factor, an output voltage, and reactive power of a generator. Information related to the aforementioned operation index is measured in a gas turbine generator in real time and is transmitted to the apparatus for detecting the abnormal vibration. Accordingly, it is possible to extract an operation index causing an abnormal vibration by comparing the operation index value over time with a Hotelling's $T^2$.

In an exemplary embodiment, the operation index extractor 130 extracts an operation index causing an abnormal vibration by comparing correlation analysis coefficients with a reference coefficient, the coefficient being extracted by performing a correlation analysis on a Hotelling's $T^2$ and one or more operation indexes. The operation index extractor 130 extracts a correlation analysis coefficient by performing a correlation analysis on a Hotelling's $T^2$ and an operation index. The extracted correlation coefficient is compared with a reference coefficient. The reference coefficient may have, for example, an absolute value of 10.31 or more. When an absolute value of the extracted correlation analysis coefficient is more than that of the reference value, an operation index corresponding to the extracted analysis coefficient is extracted as an operation index causing an abnormality of vibration characteristics.

When there are any two variables $a_i$ and $b_i$ on which a correlation analysis is to be performed, where i=1, 2, ..., and n, a correlation analysis coefficient, i.e., a Spearman's rank correlation coefficient ρ, may be calculated by Equation 8:

$$\rho = 1 - \frac{6\sum_{i=1}^{n} d_i^2}{n(n^2 - 1)}, \text{ where } \sum_{i=1}^{n} d_i^2 = \sum_{i=1}^{n} [a_{(i)} - b_{(i)}]^2 \quad (8)$$

where $a_{(i)}$ and $b_{(i)}$ are a rank of an $i^{th}$ value thereof and n is the number of data. For example, $a_{(i)}$ is a Hotelling's $T^2$, and $b_{(i)}$ is any one operation index of operation indexes. The operation index extractor 130 performs a correlation analysis on all operation indexes among the operation indexes and the Hotelling's $T^2$ based on Equation 8.

In an exemplary embodiment, the operation index extractor 130 extracts an operation index causing an abnormality in vibration characteristics from one or more operation indexes using a residual magnitude between a Hotelling's $T^2$ when there are all operation indexes among the operation indexes, and a Hotelling's $T^2$ when there are only the remaining operation indexes except for an operation index on which a contribution measurement is to be performed.

The operation index on which the contribution measurement is to be performed is, for example, an operation index of which an absolute value of an extracted correlation analysis coefficient is more than that of a reference coefficient. When a residual magnitude between a Hotelling's $T^2$ when there is the operation index on which the contribution measurement is to be performed, and the Hotelling's $T^2$ when there are all operation indexes is more than a reference value, the operation index on which the contribution measurement is to be performed is extracted as the operation index causing the abnormality in the vibration characteristics. That is, an operation index having high contribution is extracted as the operation index causing the abnormality in the vibration characteristics.

$\bar{x}_j$ is an average value of operation values in a $j^{th}$ subgroup. For example, an m number of subgroups are present in an entire section, and $\bar{x}_j$ is an average value in a $j^{th}$ subgroup among the m number of subgroups. $\bar{x}_j$ may be calculated by Equation 9:

$$\bar{x}_i = \frac{1}{n}\sum_{i=1}^{n} x_{ij} \qquad (9)$$

where, n is the number of data included in a subgroup.

$\bar{x}_j^{(-k)}$, where k=1, ..., and q, is an average value of the remaining operation indexes in the $j^{th}$ subgroup from which a $k^{th}$ operation index is removed. For example, it is synthesized, by way of example, as follows:

$$\bar{x}_j = (\bar{x}_{j1}, \bar{x}_{j2}, \ldots, \bar{x}_{jq}), \bar{x}_j^{(-k)} = (\bar{x}_{j1}, \ldots, \bar{x}_{j(k-1)}, \bar{x}_{j(k+1)}, \ldots, \bar{x}_{jq}).$$

$T_j^2$ is a Hotelling's $T^2$ in a $j^{th}$ rotor vibration subgroup.

$f(\bar{x}_j, \theta)$ is any learning model for describing a relation between an operation index matrix X and a Hotelling's $T^2$ obtained using vibration data of the rotor, the operation index matrix X being obtainable using statistics, machine learning, artificial intelligence (AI) method, and the like. $\theta$ is a parameter vector determining characteristics and performance of a learning model and is determined based on the given data, X, and the Hotelling's $T^2$ through model learning. In this case, any learning model may be changed according to characteristics of the data. For example, the learning model may include a multiple linear regression model, a generalized linear model, a support vector machine, a neural network, and the like.

$\hat{T}_j^2$ is an estimate or a predicted value of $T_j^2$ and is calculated trough the learning model $f(\bar{x}_j, \theta)$. $e_j$ is a residual between $\hat{T}_j^2$ calculated trough the learning model $f(\bar{x}_j, \theta)$ and actual data $T_j^2$ and may be calculated by Equation 10:

$$e_j = (T_j^2 - \hat{T}_j^2). \qquad (10)$$

The sum of squared error (SSE) is an index for measuring performance of a learning model and may be calculated by Equation 11:

$$SSE = \sum_{j=1}^{m} e_j^2 = \sum_{j=1}^{m}(T_j^2 - \hat{T}_j^2)^2. \qquad (11)$$

$f(\bar{x}_j^{(-k)}, \theta^{(-k)})$ is a learning model from which a $k^{th}$ operation index is removed, $\hat{T}_j^{2(-k)}$ is an estimate of $T_j^2$, $e_j^{(-k)}$ is a residual, and $SSE^{(-k)}$ is the sum of squared error (SSE). $f(\bar{x}_j^{(full)}, \theta^{(full)})$, $\hat{T}_j^{2(full)}$, $e_j^{(full)}$, and $SSE^{(full)}$ are learning models including all operation indexes, an estimate of $T_j^2$, a residual, and SSE, respectively.

Contribution of each operation index influencing vibration characteristics of the rotor, i.e., a Hotelling's $T^2$, is calculated through an SSE difference between a full learning model and a reduced learning model, the full learning model using all operation indexes, and the reduced learning model using operation indexes except for one operation index among all operation indexes. The contribution may be represented by Equation 12:

$$SSE^{(full)} - SSE^{(-k)} = \text{contribution of } kth \text{ operation index}. \qquad (12)$$

An operation index having the highest contribution calculated through Equation 12 may be extracted as an operation index causing an abnormality in vibration characteristics.

The apparatus for detecting the abnormal vibration in the rotor may perform a learning model and a contribution analysis in a section in which a Hotelling's $T^2$ is relatively abruptly changed. In an exemplary embodiment, the apparatus for detecting the abnormal vibration in the rotor further includes a peak-to-peak value calculation unit 150 and an abnormal vibration determination unit 140.

In an exemplary embodiment, the peak-to-peak value calculation unit 150 calculates first to fourth peak-to-peak values according to the number of rotations of the rotor. The peak-to-peak value calculation unit 150 calculates the first to fourth peak-to-peak values according to the number of rotations of the rotor by combining first to fourth peak-to-peak values over time with the number of rotations of the rotor over time.

In an exemplary embodiment, when at least one of the first to fourth peak-to-peak values exceeds a threshold value, the abnormal vibration determination unit 140 determines an abnormal vibration in the rotor. For example, the threshold value may be set to about 75 The abnormal vibration determination unit 140 determines whether there is an abnormal vibration in the rotor in an acceleration section before a regular section, in which the rotor is accelerated from an initial rotation speed. The abnormal vibration determination unit 140 determines whether there is an abnormal vibration in the rotor in a deceleration section, in which the rotor is gradually decelerated from the regular section. When at least one of the first to fourth peak-to-peak values according to the number of rotations of the rotor exceeds the threshold value, the abnormal vibration determination unit 140 determines an abnormal vibration in the rotor.

Figure 2:
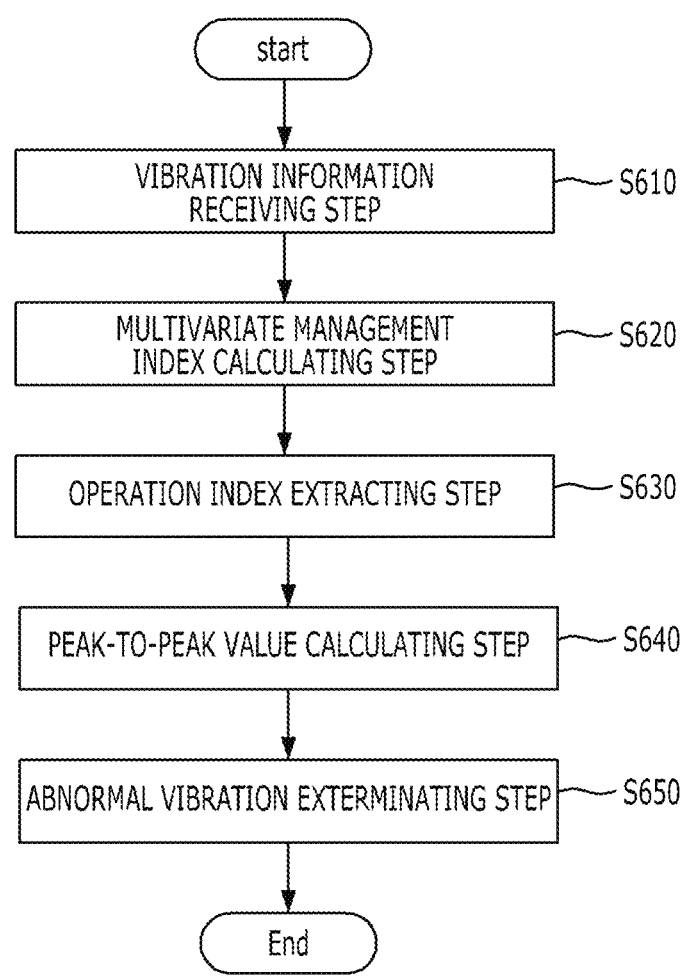
FIG. 2 is an overall flowchart of a method for detecting abnormal vibrations of a rotor, according to an exemplary embodiment.

FIG. 2 is an overall flowchart of a method for detecting abnormal vibrations of a rotor, according to an exemplary embodiment.

In an exemplary embodiment, the method of detecting the abnormal vibration in the rotor includes a vibration information receiving step (S610), a multivariate management index calculating step (S620), and an operation index extracting step (S630). In the vibration information receiving step (S610), at least one type of information among 4D vibration information and rotor rotation information on the rotor is received, the four dimensions being placed along the locations and the directions of the rotor included in a generator, and the rotor rotation information including the number of rotations of the rotor. The aforementioned generator is, for example, a gas turbine generator (GTG).

The aforementioned locations of the rotor include a turbine end (TE) of the rotor and a collector end (CE) of the rotor. The aforementioned directions of the rotor include two axis directions, i.e., an X-axis direction and a Y-axis direction orthogonal to each other. The vibration information regarding the four dimensions includes vibration information on the rotor in the X-axis direction and the Y-axis direction orthogonal to each other at the turbine end of the rotor and vibration information on the rotor in the X-axis direction and the Y-axis direction orthogonal to each other at the collector end of the rotor. The vibration information on the rotor indicates, for example, a peak-to-peak value of a vibration. A unit of the peak-to-peak value is, for example, micrometer (μm), and the number of rotations of the rotor over time is expressed in rotations per minute (RPM).

In the vibration information receiving step (S610), an RPM value of the rotor is received according to the rotation of the rotor. In the vibration information receiving step (S610), peak-to-peak values of a rotor vibration are received in the X-axis direction and the Y-axis direction orthogonal to each other at the turbine end of the rotor, and peak-to-peak values of a rotor vibration are received in the X-axis direction and the Y-axis direction orthogonal to each other at the collector end of the rotor. In an exemplary embodiment, in the multivariate management index calculating step (S620), multivariate management indexes including a Hotelling's $T^2$ and an upper control limit (UCL) are calculated regarding vibration information regarding one or more dimensions. Vibration information on the rotor may be measured with respect to four dimensions by distinguishing the locations and the directions of the rotor, and a correlation between of at least two dimensions among the four dimensions may be analyzed. When vibration characteristics regarding a single dimension are analyzed through a multivariate analysis, an influence due to a combination of vibration information of respective dimensions may be overlooked, a correlation being present between the respective dimensions. Thus, the accurate behavior of vibration information cannot be evaluated.

Accordingly, it is necessary to take into account a correlation between respective axes through a multivariate analysis regarding 4D vibration information (i.e., four axes) of the rotor. It is necessary to apply a management index taking into account the correlation between the respective axes. The management index may be calculated by Equation 1 presented above.

When an observed value vector [yi](i=1, . . . , n) of a rotor vibration is given, a Hotelling's $T^2$ is calculated by Equation 1. The observed value vector is a peak-to-peak value of a vibration with respect to any one axis among a plurality of axes of the rotor in a subgroup. An n number of $y_i$ may be present in a specific time section, i.e., a subgroup. That is, the peak-to-peak value of the vibration may be measured n times in μm. The Hotelling's $T^2$ is a Hotelling's T-squared value. The Hotelling's $T^2$ is a value for measuring a degree in which an observed value having a multivariate attribute deviates from a center of a fluctuation.

y is a vibration data matrix of the rotor. For example, $y_{ij}$ (where i=1, . . . , and n, and j=1, . . . , and m) is a P-dimensional matrix. The "P" may be four. That is, the "P" is a number of axes, which is a criterion for measuring a vibration of the rotor.

$\bar{y}_j$ is an average value of peak-to-peak values of a vibration in any one subgroup. As described above, $\bar{y}_j$ is a P-dimensional matrix. That is, $\bar{y}_j$ may be a four-dimensional matrix having elements such as a first peak-to-peak value, a second peak-to-peak value, a third peak-to-peak value, and a fourth peak-to-peak value, the first peak-to-peak value being a peak-to-peak value of a vibration at the turbine end of the rotor with respect to an X-axis direction orthogonal to a line connecting one end and the other end of the rotor in any one subgroup, the second peak-to-peak value being a peak-to-peak value of a vibration at the turbine end of the rotor with respect to a Y-axis direction orthogonal to the line connecting one end and the other end of the rotor in any one subgroup, the third peak-to-peak value being a peak-to-peak value of a vibration at the collector end of the rotor with respect to the X-axis direction orthogonal to the line connecting one end and the other end of the rotor in any one subgroup, and the fourth peak-to-peak value being a peak-to-peak value of a vibration at the collector end of the rotor with respect to the Y-axis direction orthogonal to the line connecting one end and the other end of the rotor in any one subgroup.

$\bar{y}_j$ may be calculated by Equation 2 presented above. The aforementioned "j" is a numeral corresponding to any one subgroup, and the aforementioned "n" is a number of data included in any one subgroup.

A subgroup is a specific time section, for example, one hour. That is, an average value of peak-to-peak values of a vibration with respect to four axes in a subgroup means an average value of peak-to-peak values of a vibration with respect to four axes in a specific time section.

$S_j$ is a covariance matrix and may be calculated by Equation 3 presented above. $\bar{y}$ is an average value of peak-to-peak values of a vibration in an entire section including all subgroups and may be calculated by Equation 4 presented above, where the number of subgroups is m. Σ is a pooled covariance matrix and may be calculated by Equation 5 presented above.

A Hotelling's $T^2$ statistically follows an F-distribution and thus may be approximately calculated as in Equation 6 presented above. In Equation 6, m is the number of subgroups, and n is the number of data included in the subgroup. P is the number of axes, which is a criterion for measuring a peak-to-peak value. The "P" may be four.

As a result, the Hotelling's $T^2$ is calculated using a transposed matrix of the deviation, i.e., the difference between the average value of the peak-to-peak values of the vibration with respect to the four axes in a subgroup and the average value of the peak-to-peak values of the vibration with respect to the four axes in the entire section. In addition, the Hotelling's $T^2$ is calculated using a covariance matrix of the deviation. That is, the Hotelling's $T^2$ is calculated by multiplying the transposed matrix of the deviation by the covariance matrix of the deviation.

As explained above, the upper control unit (UCL) is determined by an F-distribution function, the number of data (i.e., the number of peak-to-peak values measured with respect to each axes), a tolerance a, the number of axes P, and the number of subgroups K (obtained by dividing an entire section into subgroups). a is, for example, 0.001, and P is, for example, four. The upper control limit of the Hotelling's $T^2$ may be calculated with respect to a significance level α through Equation 7 presented above, where m is the number of subgroups, n is the number of data included in the subgroup, and P is the number of axes.

In an exemplary embodiment, in the multivariate management index calculating step (S620), multivariate management indexes including a Hotelling's $T^2$ and an upper control limit (UCL) are calculated regarding 4D vibration information in a regular section in which a rotor speed is constant. The rotor section in which the rotor speed is constant means a section in which the rotor is operated at a constant speed after the acceleration of the rotor is completed.

In an exemplary embodiment, the operation index extractor 130 determines an abnormality in vibration characteristics of the rotor when the Hotelling's $T^2$ is greater than the upper control limit (UCL) and extracts an operation index causing the abnormality in vibration characteristics of the rotor from one or more operation indexes. The operation index extractor 130 determines whether there is an abnormality in vibration characteristics of the rotor, and further extracts the operation index causing the abnormality in vibration characteristics of the rotor. The detailed descriptions of the operation index extractor 130 will be provided below.

In an exemplary embodiment, the vibration information regarding the four dimensions along the locations and the directions of the rotor includes a first peak-to-peak value, a second peak-to-peak value, a third peak-to-peak value, and a fourth peak-to-peak value. The first peak-to-peak value is a peak-to-peak value of a vibration at one end of the rotor with respect to an X-axis direction orthogonal to a line connecting one end and the other end of the rotor. The second peak-to-peak value is a peak-to-peak value of a vibration at one end of the rotor with respect to a Y-axis direction orthogonal to the line connecting one end and the other end of the rotor. The third peak-to-peak value is a peak-to-peak value of a vibration at the other end of the rotor with respect to the X-axis direction orthogonal to the line connecting one end and the other end of the rotor. The fourth peak-to-peak value is a peak-to-peak value of a vibration at the other end of the rotor with respect to the Y-axis direction orthogonal to the line connecting one end and the other end of the rotor. One end may be the turbine end, and the other end may be the collector end.

According to the present disclosure, vibration information on the rotor may be measured with respect to four dimensions by distinguishing the locations and the directions of the rotor, and a correlation between at least two dimensions among the four dimensions may be analyzed. When vibration characteristics regarding a single dimension are analyzed through a multivariate analysis, an influence due to a combination of vibration information of respective dimensions may be overlooked, a correlation being present between the respective dimensions. Thus, the accurate behavior of vibration information cannot be evaluated. Therefore, it is necessary to take into account a correlation between respective axes through a multivariate analysis regarding 4D vibration information (i.e., four axes) of the rotor.

In an exemplary embodiment, in the multivariate management index calculating step (S620), the Hotelling's $T^2$ is calculated using a deviation, i.e., a difference between an average value of the first to fourth peak-to-peak values in a specific time section and an average value of the first to fourth peak-to-peak values in an entire time section. The specific time section is, for example, one hour.

As a result, the Hotelling's $T^2$ is calculated using a transposed matrix of the deviation, i.e., the difference between the average value of the peak-to-peak values of the vibration with respect to the four axes in a subgroup and the average value of the peak-to-peak values of the vibration with respect to the four axes in the entire section. In addition, the Hotelling's $T^2$ is calculated using a covariance matrix of the deviation. That is, the Hotelling's $T^2$ is calculated by multiplying the transposed matrix of the deviation by the covariance matrix of the deviation.

In an exemplary embodiment, in the operation index extracting step (S630), at least one of the Hotelling's $T^2$, the first to fourth peak-to-peak values, and an operation index value over time is output on a display unit. The Hotelling's $T^2$ and the operation index value are output as a numeral value over time. An operation index value at a time in which an abnormal vibration is detected may be confirmed when an operation index value in a time section in which a Hotelling's $T^2$ exceeds an upper control limit (UCL). Therefore, it is possible to extract an operation index causing an abnormal vibration.

In an exemplary embodiment, the operation index includes at least one of a temperature of a thrust bearing pad metal, a temperature of a stator gas, and a voltage, a current, a power factor, an output voltage, and reactive power of a generator. Information related to the aforementioned operation index is measured in a gas turbine generator in real time and is transmitted to an apparatus for detecting an abnormal vibration. Accordingly, it is possible to extract an operation index causing an abnormal vibration by comparing the operation index value over time with a Hotelling's $T^2$.

In an exemplary embodiment, in the operation index extracting step (S630), an operation index causing an abnormal vibration is extracted by comparing correlation analysis coefficients with a reference coefficient, the coefficient being extracted by performing a correlation analysis on a Hotelling's $T^2$ and one or more operation indexes. In the operation index extracting step (S630), a correlation analysis coefficient is extracted by performing a correlation analysis on a Hotelling's $T^2$ and an operation index. The extracted correlation coefficient is compared with a reference coefficient. The reference coefficient may have, for example, an absolute value of |0.3| or more. When an absolute value of the extracted correlation analysis coefficient is more than that of the reference value, an operation index corresponding to the extracted analysis coefficient is extracted as an operation index causing an abnormality of vibration characteristics.

When there are any two variables $a_i$ and $b_i$ on which a correlation analysis is to be performed, where i=1, 2, . . . , and n, a correlation analysis coefficient, i.e., a Spearman's rank correlation coefficient ρ, may be calculated by Equation 8 presented above, where $a_{(i)}$ and $b_{(i)}$ are a rank of an $i^{th}$ value thereof and n is the number of data. For example, $a_{(i)}$ is a Hotelling's $T^2$, and $b_{(i)}$ is any one operation index of operation indexes. In the operation index extracting step (S630), a correlation analysis is performed on all operation indexes among the operation indexes and the Hotelling's $T^2$ based on Equation 8.

In an exemplary embodiment, in the operation index extracting step (S630), an operation index causing an abnormality in vibration characteristics is extracted from one or more operation indexes using a residual magnitude between a Hotelling's $T^2$ when there are all operation indexes among the operation indexes, and a Hotelling's $T^2$ when there are only the remaining operation indexes except for an operation index on which a contribution measurement is to be performed.

The operation index on which the contribution measurement is to be performed is, for example, an operation index of which an absolute value of an extracted correlation analysis coefficient is more than that of a reference coefficient. When a residual magnitude between a Hotelling's $T^2$ when there is the operation index on which the contribution measurement is to be performed, and the Hotelling's $T^2$ when there are all operation indexes is more than a reference value, the operation index on which the contribution measurement is to be performed is extracted as the operation index causing the abnormality in the vibration characteristics. That is, an operation index having high contribution is extracted as the operation index causing the abnormality in the vibration characteristics.

$\bar{x}_j$ is an average value of operation values in a $j^{th}$ subgroup. For example, an m number of subgroups are present in an entire section, and $\bar{x}_j$ is an average value in a $j^{th}$ subgroup among the m number of subgroups. $\bar{x}_j$ may be calculated by Equation 9 presented above, where n is the number of data included in a subgroup.

$\bar{x}_j^{(-k)}$, where k=1, . . . , and q, is an average value of the remaining operation indexes in a subgroup from which a $k^{th}$ operation index is removed. For example, it is synthesized, by way of example, as follows:

$\bar{x}_j = (\bar{x}_{j1}, \bar{x}_{j2}, \ldots, \bar{x}_{jq}), \bar{x}_j^{(-k)} = (\bar{x}_{j1}, \ldots, \bar{x}_{j(k-1)}, \bar{x}_{j(k+1)}, \ldots, \bar{x}_{jq}).$  a.

$T_j^2$ is a Hotelling's $T^2$ in a $j^{th}$ rotor vibration subgroup.

$f(\bar{x}_j, \theta)$ is any learning model for describing a relation between an operation index matrix X and a Hotelling's $T^2$ obtained using vibration data of the rotor, the operation index matrix X being obtainable using statistics, machine learning, an artificial intelligence (AI) method, and the like. $\Theta$ is a parameter vector determining characteristics and performance of a learning model and is determined based on the given data, X and the Hotelling's $T^2$ through model learning. In this case, any learning model may be changed according to characteristics of the data. For example, the learning model may include a multiple linear regression model, a generalized linear model, a support vector machine, a neural network, and the like.

$\hat{T}_j^2$ is an estimate or a predicted value of $T_j^2$ and is calculated trough the learning model $f(\bar{x}_j, \theta)$. $e_j$ is a residual between $\hat{T}_j^2$ calculated trough the learning model $f(\bar{x}_j, \theta)$ and actual data $T_j^2$ and may be calculated by Equation 10 presented above. The sum of squared error (SSE) is an index for measuring performance of a learning model and may be calculated by Equation 11 presented above.

$f(\underline{x}_j^{(-k)}, \theta^{(-k)})$ is a learning model from which a $k^{th}$ operation index is removed $\bar{T}_j^{2(-k)}$ is an estimate of $T_j^2$, $e_j^{(-k)}$ is a residual, and $SSE^{(-k)}$ is the sum of squared error (SSE). $f(\bar{x}_j^{(full)}, \theta^{(full)})$, $\hat{T}_j^{2(full)}$, $e_j^{(full)}$, and $SSE^{(full)}$ are learning models including all operation indexes, an estimate of $T_j^2$, a residual, and SSE, respectively.

Contribution of each operation index influencing vibration characteristics of the rotor, i.e., a Hotelling's $T^2$, is calculated through an SSE difference between a full learning model and a reduced learning model, the full learning model using all operation indexes, and the reduced learning model using operation indexes except for one operation index among all operation indexes. The contribution may be represented by Equation 12 presented above.

An operation index having the highest contribution calculated through Equation 12 may be extracted as an operation index causing an abnormality of vibration characteristics. The method for detecting the abnormal vibration in the rotor may be performed using a learning model and a contribution analysis in a section in which a Hotelling's T-squared value $T^2$ is relatively abruptly changed.

In an exemplary embodiment, the method of detecting the abnormal vibration in the rotor further includes a peak-to-peak value calculating step (S640) and an abnormal vibration determining step (S650).

In an exemplary embodiment, in the peak-to-peak value calculating step (S640), first to fourth peak-to-peak values according to the number of rotations of the rotor are calculated. In the peak-to-peak value calculating step (S640), the first to fourth peak-to-peak values according to the number of rotations of the rotor are calculated by combining first to fourth peak-to-peak values over time with the number of rotations of the rotor over time.

In an exemplary embodiment, in the abnormal vibration determining step (S650), an abnormal vibration in the rotor is detected when at least one of the first to fourth peak-to-peak values exceeds a threshold value. For example, the threshold value may be set to about 75 In the abnormal vibration determining step (S650), it is determined whether there is an abnormal vibration in the rotor in an acceleration section before a regular section, in which the rotor is accelerated from an initial rotation speed. In the abnormal vibration determining step (S650), it is determined whether there is an abnormal vibration in the rotor in a deceleration section, in which the rotor is gradually decelerated from the regular section. In the abnormal vibration determining step (S650), an abnormal vibration in the rotor is detected when at least one of the first to fourth peak-to-peak values according to the number of rotations of the rotor exceeds a threshold value.

Figure 3:
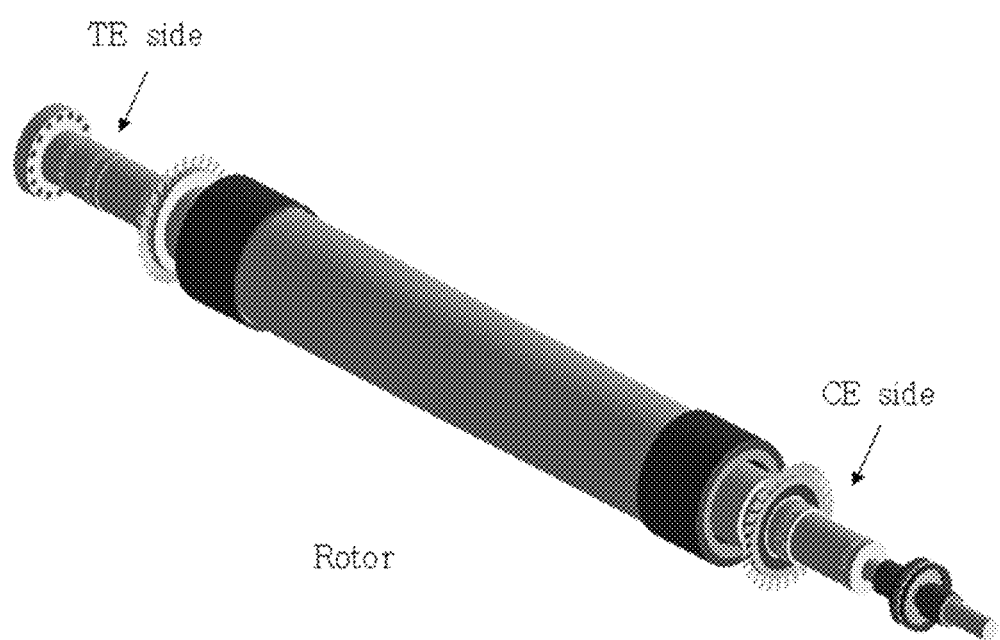
FIG. 3 is a perspective view of a turbine according to an exemplary embodiment.
Figure 4:
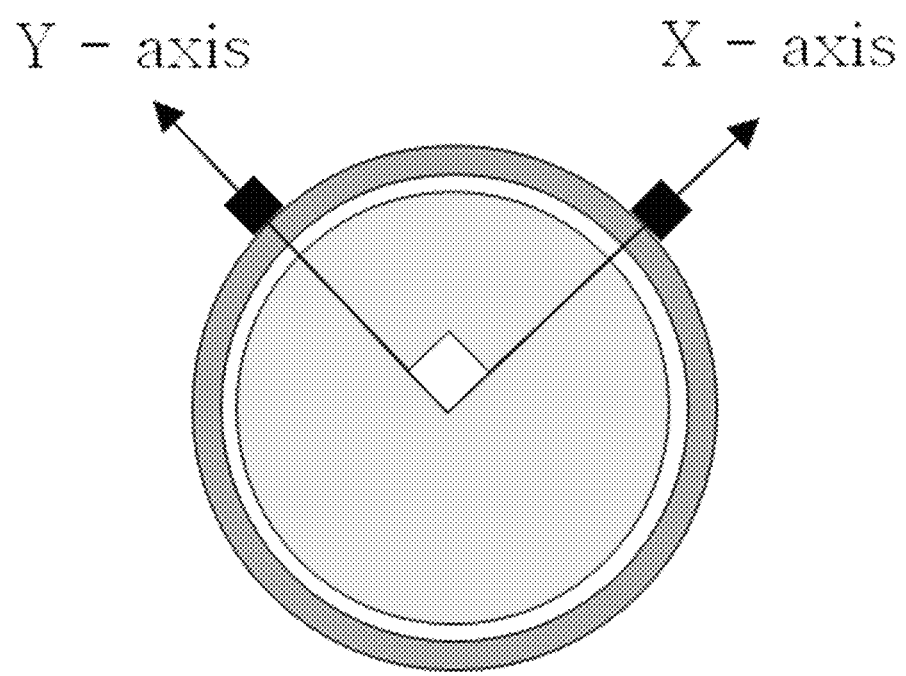
FIG. 4 is a view illustrating an X-axis and a Y-axis orthogonal to each other at a turbine end of a rotor and a front surface of the turbine end, according to an exemplary embodiment.

FIG. 3 is a perspective view of a turbine according to an exemplary embodiment. FIG. 4 is a view illustrating an X-axis and a Y-axis orthogonal to each other at a turbine end of the rotor and a front surface of the turbine end, according to an exemplary embodiment.

The locations of the rotor include a turbine end (TE) of the rotor and a collector end (CE) of the rotor. The aforementioned directions of the rotor include two axis directions, i.e., an X-axis direction and a Y-axis direction orthogonal to each other. The vibration information regarding the four dimensions includes vibration information on the rotor in the X-axis direction and the Y-axis direction orthogonal to each other at the turbine end of the rotor and vibration information on the rotor in the X-axis direction and the Y-axis direction orthogonal to each other at the collector end of the rotor. The vibration information on the rotor indicates, for example, a peak-to-peak value of a vibration. A unit of the peak-to-peak value is, for example, micrometer (μm) and the number of rotations of the rotor over time is expressed in rotations per minute (RPM) of the rotor.

Figure 5:
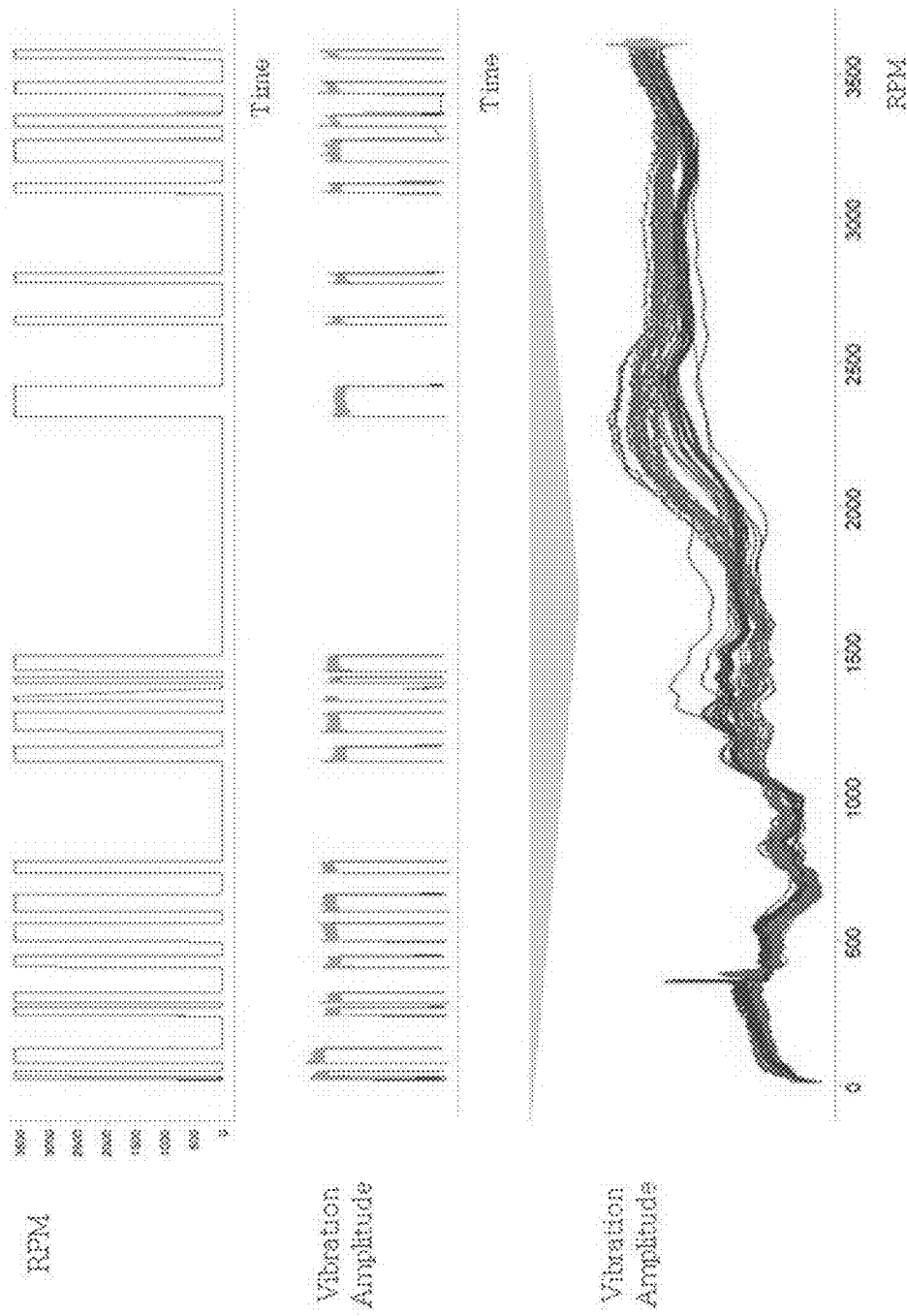
FIG. 5 are graphs respectively showing a number of rotations of the rotor over time (RPM), a peak-to-peak value of a vibration over time, and a vibration according to RPM, according to an exemplary embodiment.

FIG. 5 are graphs respectively showing the number of rotations of the rotor over time (RPM), a peak-to-peak value of a vibration over time, and a vibration according to RPM, according to an exemplary embodiment. The apparatus for detecting the abnormal vibration calculates the number of rotations of the rotor over time (RPM), a peak-to-peak value of a vibration over time, and a vibration according to RPM.

Figure 6:
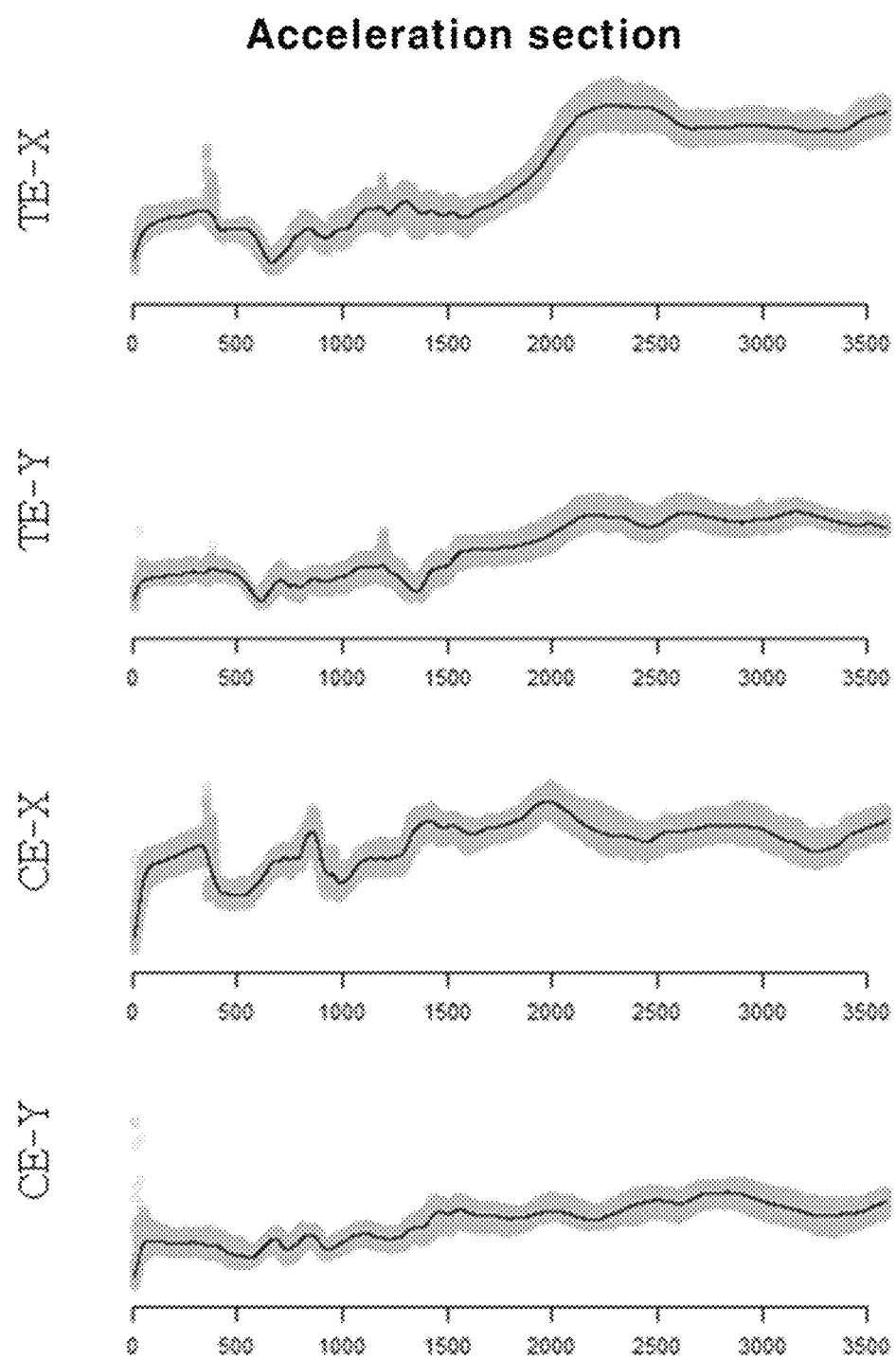
FIG. 6 are graphs respectively showing a peak-to-peak value of a vibration according to RPM in an X-axis direction of a turbine end, a peak-to-peak value of a vibration according to RPM in a Y-axis direction of the turbine end, a peak-to-peak value of a vibration according to RPM in an X-axis direction of a collector end, and a peak-to-peak value of a vibration according to RPM in a Y-axis direction of the collector end in an acceleration section of the rotor, according to an exemplary embodiment.

FIG. 6 are graphs respectively showing a peak-to-peak value of a vibration according to RPM in an X-axis direction of a turbine end, a peak-to-peak value of a vibration according to RPM in a Y-axis direction of the turbine end, a peak-to-peak value of a vibration according to RPM in an X-axis direction of a collector end, and a peak-to-peak value of a vibration according to RPM in a Y-axis direction of the collector end in an acceleration section of the rotor, according to an exemplary embodiment.

Figure 7:
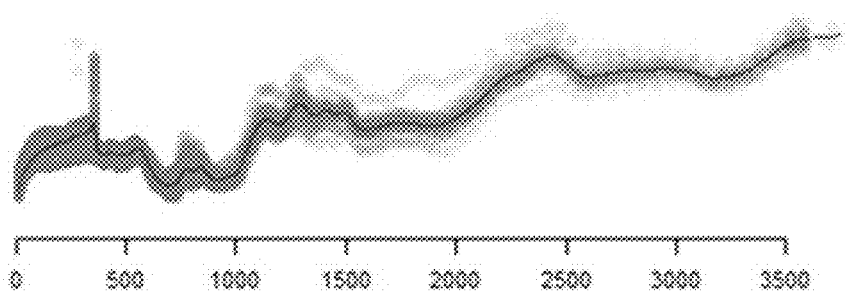
FIG. 7 are graphs respectively showing a peak to peak value of a vibration according to RPM in the X-axis direction of the turbine end, a peak to peak value of a vibration according to RPM in the Y-axis direction of the turbine end, a peak to peak value of a vibration according to RPM in the X-axis direction of the collector end, and a peak to peak value of a vibration according to RPM in the Y-axis direction of the collector end in a deceleration section of the rotor, according to an exemplary embodiment.
Figure 7:
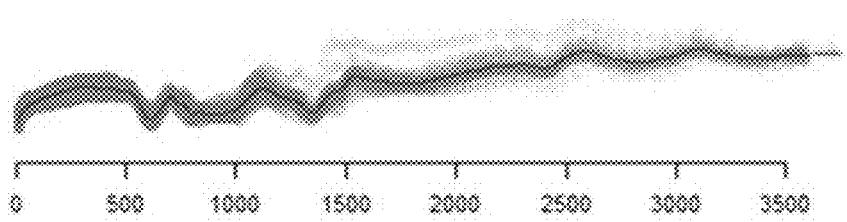
Figure 7:
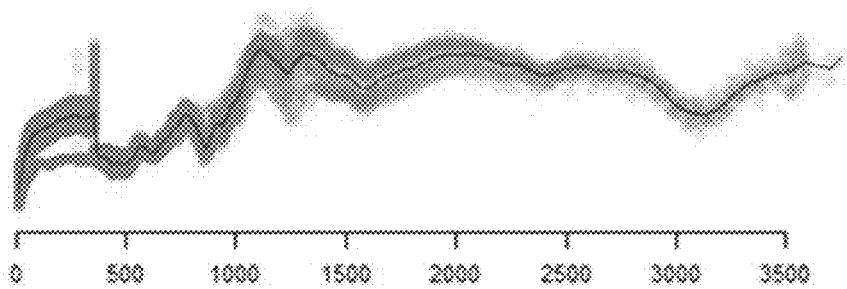
Figure 7:
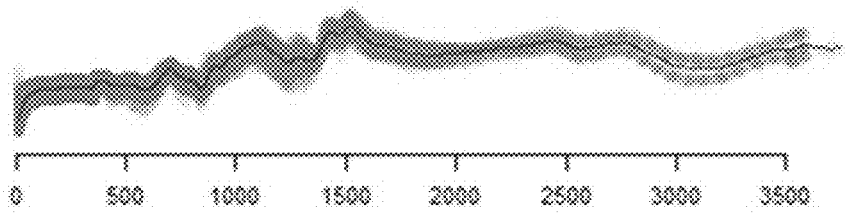

FIG. 7 are graphs respectively showing a peak to peak value of a vibration according to RPM in the X-axis direction of the turbine end, a peak to peak value of a vibration according to RPM in the Y-axis direction of the turbine end, a peak to peak value of a vibration according to RPM in the X-axis direction of the collector end, and a peak to peak value of a vibration according to RPM in the Y-axis direction of the collector end in a deceleration section of the rotor, according to an exemplary embodiment.

Figure 8:
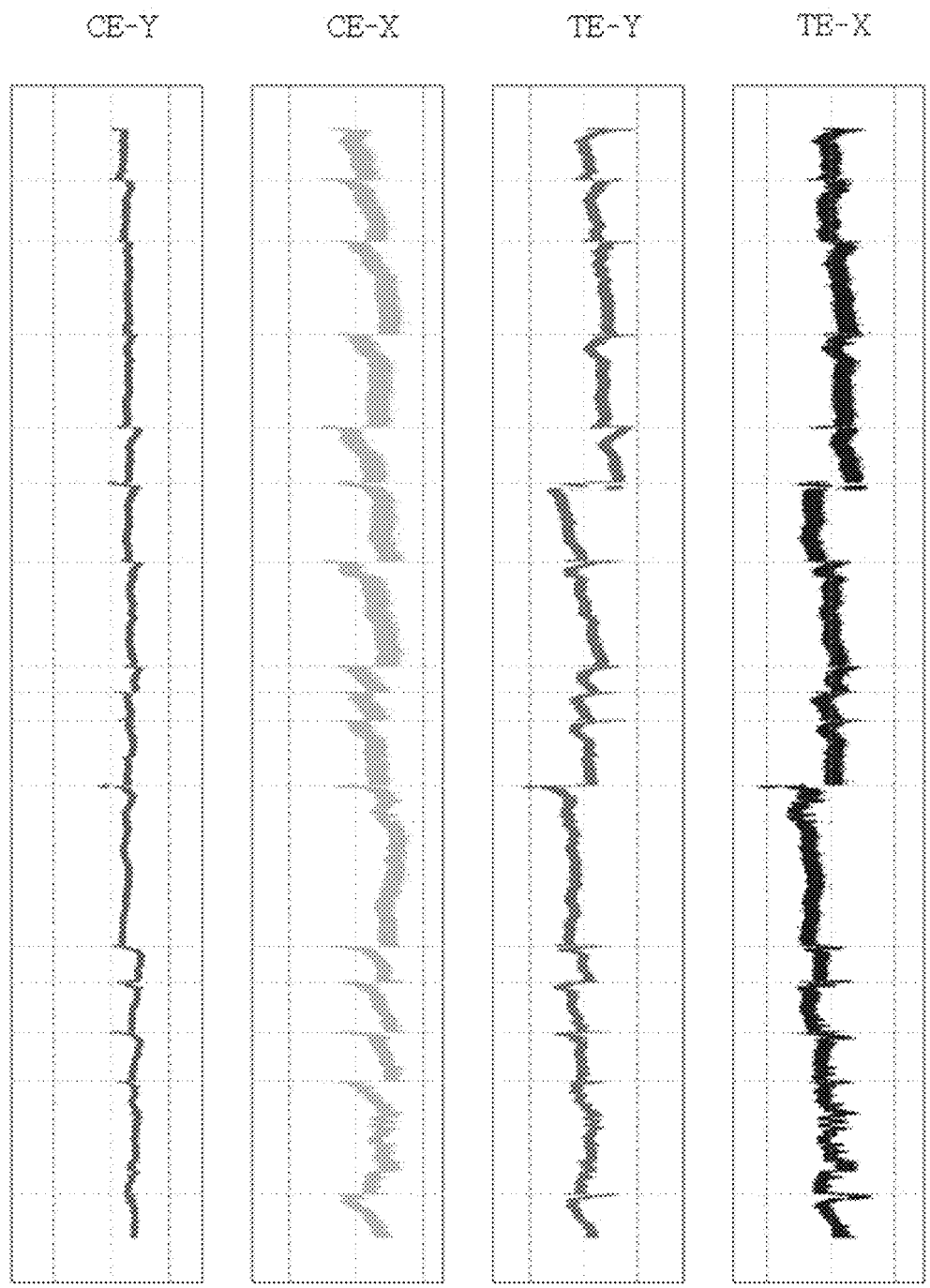
FIG. 8 are graphs respectively showing a peak to peak value of a vibration according to RPM in the X-axis direction of the turbine end, a peak to peak value of a vibration according to RPM in the Y-axis direction of the turbine end, a peak to peak value of a vibration according to RPM in the X-axis direction of the collector end, and a peak to peak value of a vibration according to RPM in the Y-axis direction of the collector end in a regular section of the rotor, according to an exemplary embodiment.

FIG. 8 are graphs respectively showing a peak to peak value of a vibration according to RPM in the X-axis direction of the turbine end, a peak to peak value of a vibration according to RPM in the Y-axis direction of the turbine end, a peak to peak value of a vibration according to RPM in the X-axis direction of the collector end, and a peak to peak value of a vibration according to RPM in the Y-axis direction of the collector end in a regular section of the rotor, according to an exemplary embodiment.

Figure 9:
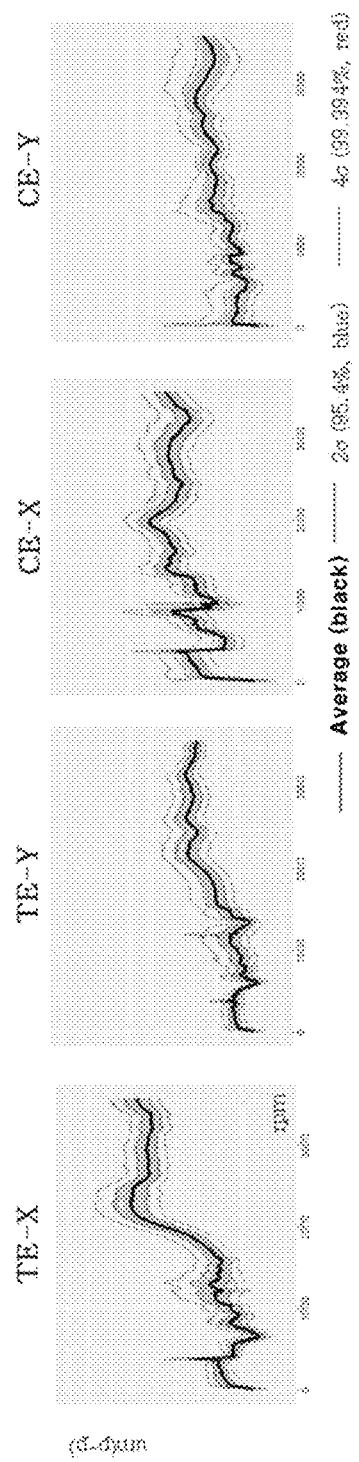
FIG. 9 are graphs respectively showing a peak to peak value of a vibration according to RPM, a 2σ confidence section, and a 4σ confidence section in the X-axis direction of the turbine end, a peak to peak value of a vibration according to RPM, a 2σ confidence section, and a 4σ confidence section in the Y-axis direction of the turbine end, a peak to peak value of a vibration according to RPM, a 2σ confidence section, and a 4σ confidence section in the X-axis direction of the collector end, and a peak to peak value of a vibration according to RPM, a 2σ confidence section, and a 4σ confidence section in the Y-axis direction of the collector end in the regular section of the rotor, according to an exemplary embodiment.

FIG. 9 are graphs respectively showing a peak to peak value of a vibration according to RPM, a 2σ confidence section, and a 4σ confidence section in the X-axis direction of the turbine end, a peak to peak value of a vibration according to RPM, a 2σ confidence section, and a 4σ confidence section in the Y-axis direction of the turbine end, a peak to peak value of a vibration according to RPM, a 2σ confidence section, and a 4σ confidence section in the X-axis direction of the collector end, and a peak to peak value of a vibration according to RPM, a 2σ confidence section, and a 4σ confidence section in the Y-axis direction of the collector end in the regular section of the rotor, according to an exemplary embodiment.

Figure 10:
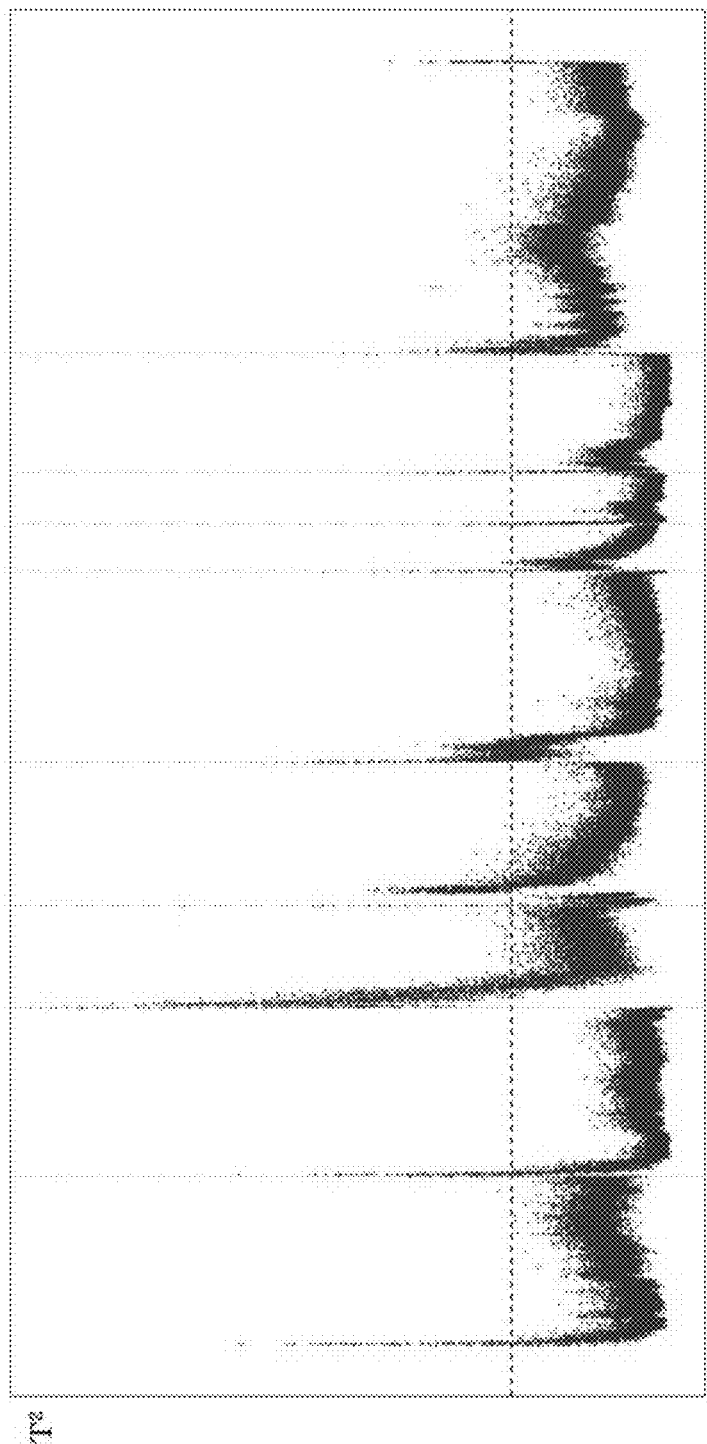
FIG. 10 is a graph showing a management index of the rotor over time according to an exemplary embodiment.

FIG. 10 is a graph showing a management index of the rotor over time, i.e., a Hotelling's $T^2$ value according to an exemplary embodiment. The dotted line indicates an upper control limit (UCL).

Figure 11:
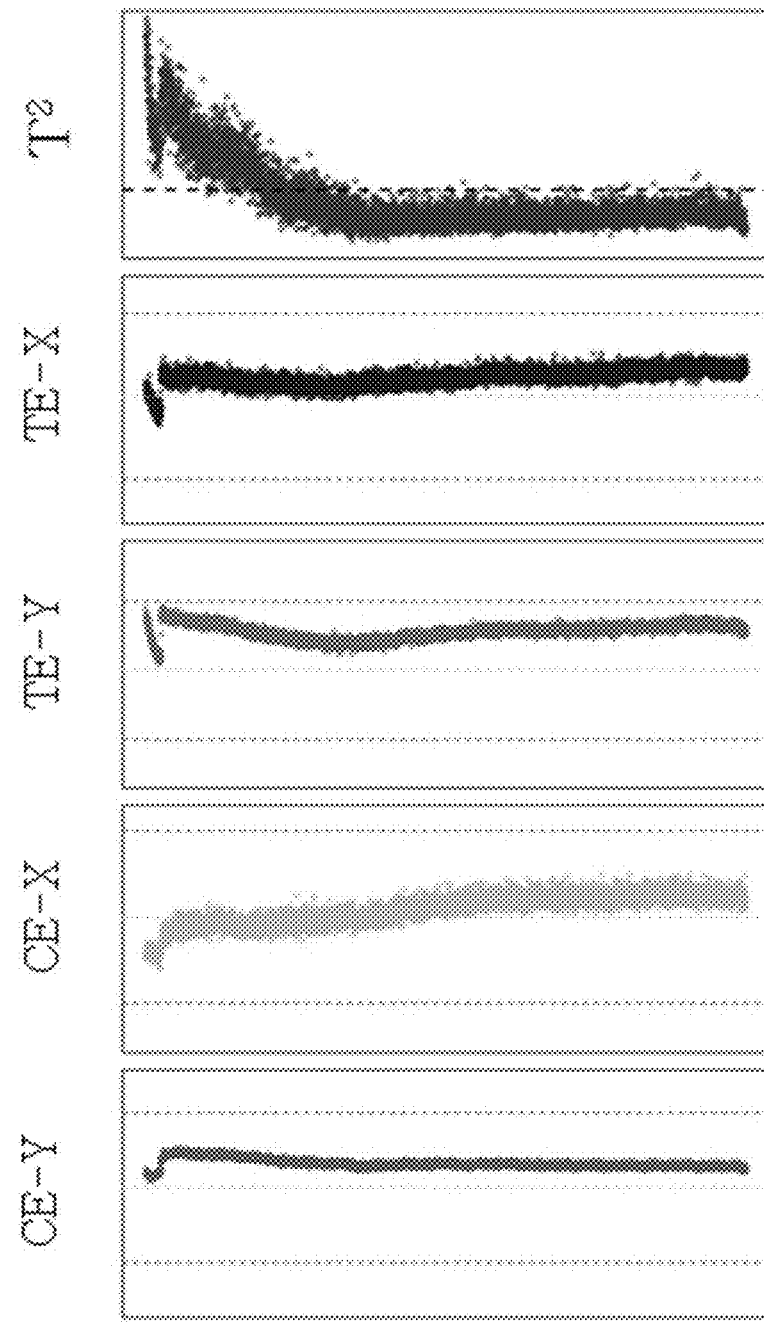
FIG. 11 is a graph showing a change amount of a vibration variable of the rotor over time according to an exemplary embodiment.

FIG. 11 is a graph showing a change amount of a vibration variable of the rotor over time according to an exemplary embodiment.

Figure 12:
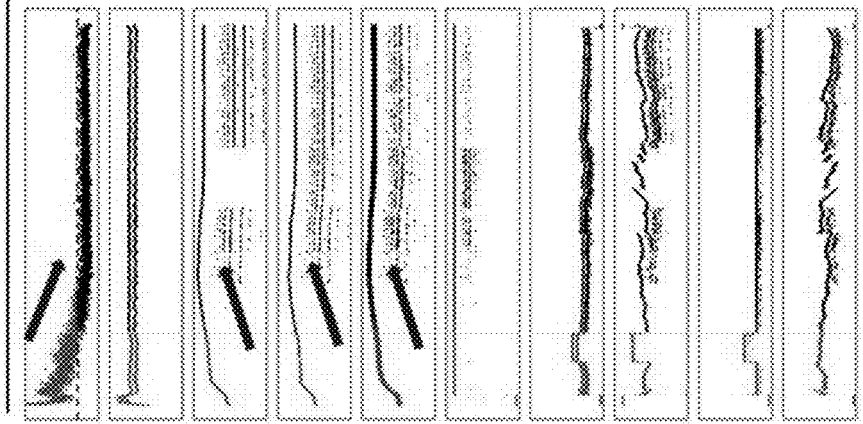
FIG. 12 are graphs showing a change amount of an operation index of the rotor over time.

FIG. 12 are graphs showing a change amount of an operation index of the rotor over time. The apparatus for detecting the abnormal vibration in the rotor may extract an operation index causing an abnormality in vibration characteristics of the rotor by extracting an operation index increasing or decreasing in a section in which a Hotelling's $T^2$ value is changed. In the exemplary embodiment illustrated in FIG. 12, STATOR COMMON GAS TEMP IN GENERATOR #1-2, STATOR COLD GAS TEMP IN GENERATOR #1-4, and STATOR HOT GAS TEMP IN GENERATOR #1-4, increasing when a Hotelling's $T^2$ increases, are extracted as the operation index causing the abnormality in vibration characteristics of the rotor.

Figure 13:
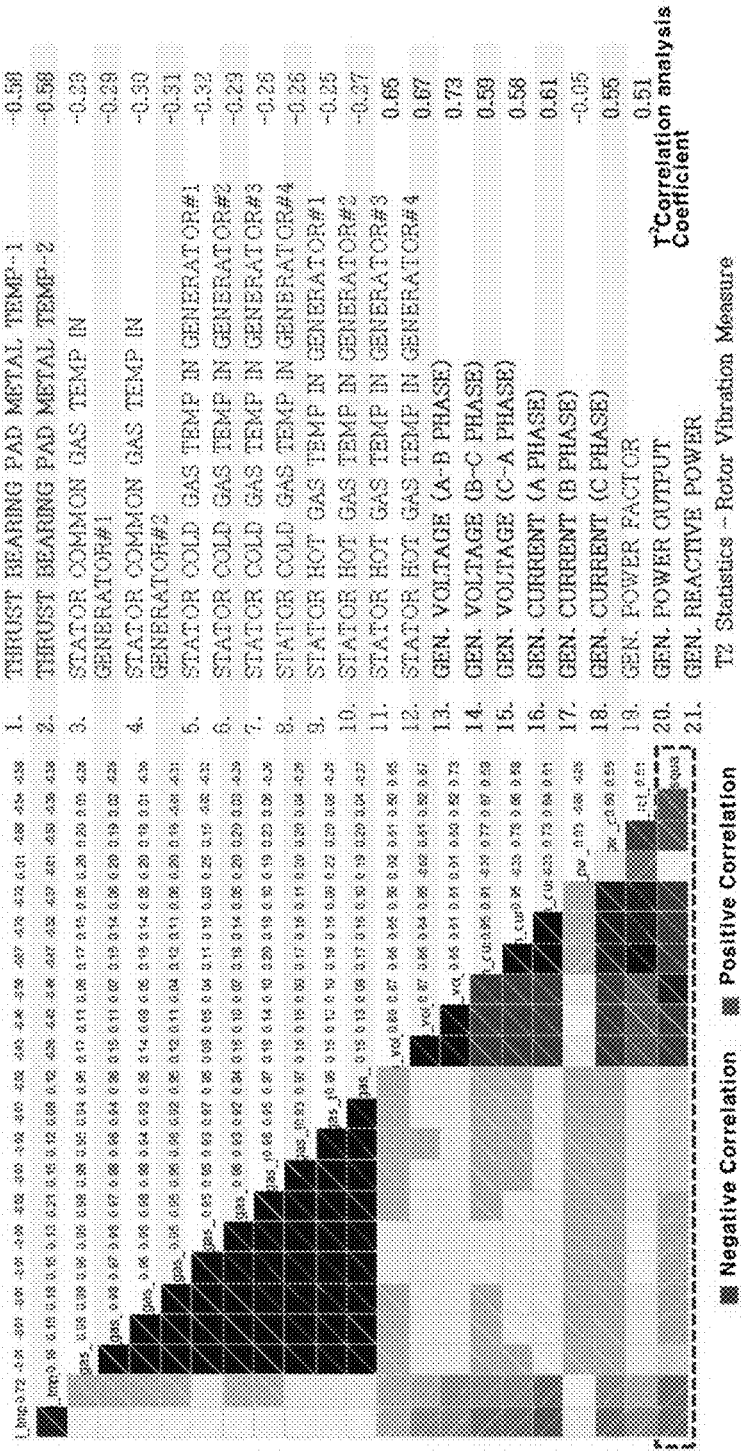
FIG. 13 illustrates correlation analysis results according to an exemplary embodiment.

FIG. 13 illustrates correlation analysis results according to an exemplary embodiment. The operation index extractor 130 extracts an operation index causing an abnormality in vibration characteristics by comparing correlation analysis coefficients with a reference coefficient, the correlation analysis coefficients being extracted by performing an correlation analysis on a Hotelling's $T^2$ and one or more operation indexes. FIG. 13 illustrates correlation analysis coefficients according to operation indexes. In comparison between an absolute value of the aforementioned correlation analysis coefficient and an absolute value of a reference coefficient, an operation index, of which an absolute of a correlation analysis coefficient is more than that of the reference coefficient, is extracted as an operation index causing an abnormality in vibration characteristics.

As set forth above, it is to be appreciated that those skilled in the art can make other specific embodiments without departing from the spirit or essential features of the present disclosure. Accordingly, the foregoing embodiments should be regarded as illustrative rather than limiting. It should also be understood that the flowcharts illustrated in the drawings are only sequences illustratively suggested to realize most preferable results in carrying out the present disclosure, but other additional steps may be provided or some steps may be omitted.

The technical features disclosed herein and an implementation executing the same may be embodied as a digital electronic circuit, as a piece of computer software, firmware, or hardware including the structures described herein and structural equivalents thereof, or as a combination of one or more thereof. The implementation of the technical features disclosed herein may be embodied as a module regarding computer program instructions encoded on a tangible program storage medium to control a program product, i.e., the operation of a processing system, or execute the program product. Examples of the computer readable recording medium include a machine readable storage disk, a memory device, a composition of a material influential to machine readable carrier wave signals, or a combination of one or more thereof.

The term "apparatus" or "system" used herein include any types of devices, apparatuses, and machines for processing data, such as a processor, a computer, and a multiprocessor. A processing system may include, in addition to hardware, for example, all codes for forming execution environments regarding computer programs as required, including codes for constituting processor firmware, protocol stacks, a database management system, an operating system, or a combination of one or more thereof.

A computer program, also referred to as a program, software, a software application, a script, codes, or the like, may be written in any form of program language, such as a compiled or interpreted language or a priori or procedural language. The computer program may be embodied in any form, including an independent program or module, a component, a subroutine, or another unit suitable to be used in a computer environment.

The computer program does not necessarily correspond to files of a file system and may be stored in a single file provided to a request program, in interacting multi-files (e.g. files in which portions of one or more modules, subprograms, or codes are stored), or in portions of files retaining another program or data (e.g. one or more scripts stored in a markup language document).

The computer program may be executed by one or more computers located in a single site or a plurality of computers distributed to a plurality of sites and connected to each other via wired/wireless communications systems.

The computer readable recording medium suitable for program instructions and data to be stored therein may include all types of non-volatile memory, media, and memory devices, including semiconductor memory devices, such as erasable read-only memory (EPROM), electrically erasable read-only memory (EEPROM), and flash memory; magnetic discs, such as an internal hard disk and an external hard disc; magneto-optical discs; compact disc read-only memory (CD-ROM); digital versatile discs (DVDs); and the like. The processor and memory may be supplemented by a special purpose logic circuit or integrated thereto.

Implementations executing the technical features as described in the specification may be embodied in a backend component, such as a data server, a middleware component, such as an application server, a front end component, such as a client computer, having a web browser or a graphic user interface (GUI) allowing a user to interact with the implementations executing the technical features described in the specification, or a computing system including all combinations of one or more thereof. The system components may be connected to each other via any type of digital data communications, such as a communications network, or any medium.

In the specification, the method may be used, in part or entirety, in a client device, a server related to a web-based storage system, or one or more processors included in the server, by a means for executing computer software, program codes, or instructions. The processor may be a part of a computing platform, such as a server, a client device, a network infrastructure, a mobile computing platform, a fixed computing platform and, more particularly, may be a type of computer or processing device able to execute program instructions, codes, and the like. In addition, the processor may further include memory storing the method for detecting abnormal vibrations of a rotor, instructions, codes, and program. When no memory is provided, the processor may access a storage device, such as CD-ROM, a DVD, memory, a hard disc, a flash drive, random access memory (RAM), read-only memory (ROM), and a cache, in which the method, instructions, codes, and program according to the present disclosure are stored, using a separate interface.

The apparatus described in the specification and the method for detecting abnormal vibrations of a rotor may be used, in part or entirety, using a device executing computer software in a server, a client device, a gateway, a hub, a router, or network hardware. The software may be executed by a variety of types of servers, such as a file server, a print server, a domain server, an Internet server, an intranet server, a host server, a distributed server, and the like. These servers may respectively include memory, a processor, a computer readable recording medium, a storage medium, a communications device, a port, a client device, and an interface providing access to the other servers via wired/wireless networks.

The method, instructions, codes, and the like according to the present disclosure may be executed by the server. Other devices necessary for executing the method for detecting abnormal vibrations of a rotor may be implemented as parts of a hierarchy associated with the server.

In addition, the server may provide an interface to other devices including, without limitations, another server, a printer, a database server, a print server, a communications server, a distributed server, and the like. Connections using the interface may facilitate remote execution of programs via wired/wireless networks.

Any one of the devices connected to the server via the interface may further include at least one storage device able to store a method, instructions, codes, and the like for issuance of a face-to-face one-time passcode (OTP) application. The central process of the server may provide the storage device with instructions, codes, and the like to be executed in different devices, so that the instructions, codes, and the like are stored therein.

The method in the specification may be used, in part or entirety, using a network infrastructure. The network infrastructure may include devices, such as a computing device, a server, a router, a hub, a firewall, a client, a personal computer (PC), a communications device, and a routing device, as well as separate modules able to execute functions thereof. In addition to these devices and modules, the network infrastructure may further include a storage medium, such as flash memory, a buffer, a stack, RAM, and ROM. In addition, the walking path guidance service method based on the measurement of user movements, instructions, codes, and the like may be executed and stored by any one of the device, module, and storage medium of the network infrastructure. Other devices necessary for the execution of the method may be implemented as parts of the network infrastructure.

In addition, the apparatus and method described in the specification may be implemented using hardware or a combination of hardware and software suitable for a specific application. The term "hardware" used herein includes all of general purpose computing devices, such as a PC and a mobile communications device, and specific office computing devices. The computing devices may be implemented as a device including any one, or a combination, of a microprocessor, a digital signal processor, an application integrated circuit (IC), a programmable gate array, a programmable array system.

The computer software, instructions, codes, and the like, as described above, may be stored and accessed by a readable device. The term "readable device" used herein may include all types of memory, such as computer components containing digital data used in computing for a predetermined period of time; semiconductor storages, such as RAN or ROM; permanent storages, such as an optical disc; mass storages, such as a hard disc, a tape, and a drum; optical storages, such as CD-ROM or a DVD; flash memory; floppy discs; magnetic tapes; paper tapes; independent RAM discs; mass storages detachable from computers; dynamic memory; static memory; variable storages; and network connected storages, such as cloud memory. The terms "instructions" and "codes" used herein may include all types of languages, such as data-oriented languages, such as SQL and dBase; system languages, such as C language, objective C language, C++ language, and assembly language; architecture languages, such as Java and NET; and application languages, such as PHP, Ruby, Perl, and Python. However, the terms "instructions" and "codes" are not limited thereto and may include any languages well-known to those skilled in the art to which the present disclosure relates.

In addition, the term "computer readable medium" used herein may include all types of media that contribute to providing instructions to the process for the execution of a program. Specifically, the term "computer readable medium" may include non-volatile media, such as a data storage device, an optical disk, and a magnetic disc; volatile media, such as dynamic memory; and transmission media, such as a coaxial cable transferring data, a copper wire, and an optical fiber, but is not limited thereto.

The components for executing the technical features of the present disclosure, included in the block diagrams and flowcharts illustrated in the accompanying drawings, indicate logical boundaries therebetween.

However, according to the embodiments of software or hardware, the illustrated components and functions thereof are executed in forms of an independent software module, a monolithic software structure, codes, a service, and a combination thereof. The functions may be stored in a medium readable by a computer having a processor able to execute the stored program codes, instructions, and the like and may be executed by a computer. Thus, all of such embodiments shall be construed as being included in the scope of right of the present disclosure.

Although the accompanying drawings and the description thereof disclose the technical features of the present disclosure, it should not be simply suggested therefrom unless a specific array of pieces of software for realizing the technical features is clearly indicated. In other words, the foregoing variety of embodiments may be modified in part while maintaining the technical features of the present disclosure, and such modifications should be construed as being included in the scope of the present disclosure.

In addition, although the flowcharts in the drawings denote the operations in specific sequences, such sequences are given to obtain most preferable results, and it should not be understood that the operations must be performed in the illustrated sequences or in sequential orders or all of the illustrated operations must be performed. In a specific case, multitasking and parallel processing may be advantageous. In addition, it should not be understood that the separation of a variety of system components according to the foregoing embodiments is required by all of the embodiments. Rather, it should be understood that the program components and systems as described above may be integrated as a single software product or packaged to multiple software products.

The specific terms disclosed in this specification are not intended to limit the present disclosure. Although the present disclosure has been described in detail with reference to the foregoing embodiments, those skilled in the art will appreciate that various modifications, additions and substitutions are possible, without departing from the scope and spirit of the present disclosure as disclosed in the accompanying claims.

The scope of the present disclosure is defined not by the detailed description but by the appended claims, and all modifications and alterations derived from the concept, the range, and the equivalents of the claims will be construed as being included in the scope of the present disclosure.

What is claimed is:

1. An apparatus for detecting abnormal vibrations of a rotor, comprising:
 a vibration information receiver configured to receive at least one type of information among vibration information regarding one or more dimensions distinguishing locations and directions of the rotor and rotor rotation information including a number of rotations of the rotor;
 a multivariate management index calculator configured to calculate multivariate management indexes from the vibration information regarding the one or more dimensions; and
 an operation index extractor configured to
  determine an abnormality in vibration characteristics of the rotor when a Hotelling's T-squared value is greater than an upper control limit, and
  extract an operation index causing the abnormality in the vibration characteristics of the rotor from a plurality of operation indexes using a residual magnitude between a Hotelling's T-squared value based on all operation indexes among the plurality of operation indexes and using the Hotelling's T-squared value based on operation indexes excluding an operation index on which a contribution measurement is to be performed,
 wherein the Hotelling's T-squared value (T2) is calculated by $$T^2 \equiv n\,(\bar{y}-\mu)^T \sum\nolimits^{-1} (\bar{y}-\mu), \text{ where } \bar{y} = \frac{1}{n}\sum_{i=1}^{n} y_i$$

where y is a vibration data matrix of the rotor, $\mu$ is a peak-to-peak value of vibration expressed in microns, n is a number of times the vibration is measured, and $y_i$ is an observed value vector of y where i=1 to n.

2. The apparatus according to claim 1,
 wherein the rotor includes a turbine end and a collector end opposite to the turbine end, each of the turbine end and the collector end having an X-axis orthogonal to a Y-axis following a line connecting the turbine end and the collector end, and
 wherein the vibration information regarding the one or more dimensions includes
 a first peak-to-peak value of a vibration at the turbine end of the rotor with respect to a direction of the X-axis,
 a second peak-to-peak value of a vibration at the turbine end of the rotor with respect to a direction of the Y-axis,
 a third peak-to-peak value of a vibration at the collector end of the rotor with respect to the direction of the X-axis, and
 a fourth peak-to-peak value of a vibration at the collector end of the rotor with respect to the direction of the Y-axis.

3. The apparatus according to claim 2, wherein the multivariate management index calculator is configured to calculate the Hotelling's T-squared value using a deviation between an average value of the first to fourth peak-to-peak values in a specific time section and an average value of the first to fourth peak-to-peak values in an entire time section.

4. The apparatus according to claim 2, wherein the operation index extractor is configured to output at least one of the Hotelling's T-squared value, the first to fourth peak-to-peak values, and an operation index value over time to a display unit.

5. The apparatus according to claim 1, wherein the one or more operation indexes include at least one of a temperature of a thrust bearing pad metal, a temperature of a stator gas, and a voltage, a current, a power factor, an output voltage, and reactive power of a generator.

6. The apparatus according to claim 1, wherein the operation index extractor is configured to extract the operation index causing the abnormality in the vibration characteristics by comparing correlation analysis coefficients with a reference coefficient, the correlation analysis coefficients being extracted by performing an correlation analysis on the Hotelling's T-squared value and the plurality of operation indexes.

7. The apparatus according to claim 2, further comprising a peak-to-peak value calculator configured to calculate the first to fourth peak values according to the number of rotations of the rotor.

8. The apparatus according to claim 2, further comprising an abnormal vibration determination unit configured to determine an abnormal vibration in the rotor when any one of the first to fourth peak-to-peak values exceeds a threshold value.

9. The apparatus according to claim 1, wherein the operation index extractor is configured to extract correlation analysis coefficients by performing a correlation analysis on the Hotelling's T-squared value and the plurality of operation indexes.

10. A method of detecting abnormal vibrations of a rotor, comprising the steps of:
 receiving at least one type of information among vibration information regarding one or more dimensions distinguishing locations and directions of the rotor and rotor rotation information including a number of rotations of the rotor;
 calculating multivariate management indexes from the vibration information regarding the one or more dimensions;
 determining an abnormality in vibration characteristics of the rotor when a Hotelling's T-squared value is greater than an upper control limit and limit; and
 extracting an operation index causing the abnormality in the vibration characteristics of the rotor from a plurality of operation indexes using a residual magnitude between a Hotelling's T-squared value based on all operation indexes among the plurality of operation indexes and using the Hotelling's T-squared value based on operation indexes excluding an operation index on which a contribution measurement is to be performed,
 wherein the Hotelling's T-squared value (T2) is calculated by $$T^2 \equiv n\,(\bar{y}-\mu)^T \sum\nolimits^{-1} (\bar{y}-\mu), \text{ where } \bar{y} = \frac{1}{n}\sum_{i=1}^{n} y_i$$

where y is a vibration data matrix of the rotor, µ is a peak-to-peak value of vibration expressed in microns, n is a number of times the vibration is measured, and $y_i$ is an observed value vector of y where i=1 to n.

11. The method according to claim 10,
wherein the rotor includes a turbine end and a collector end opposite to the turbine end, each of the turbine end and the collector end having an X-axis orthogonal to a Y-axis following a line connecting the turbine end and the collector end, and
wherein the vibration information regarding the one or more dimensions includes
a first peak-to-peak value of a vibration at the turbine end of the rotor with respect to a direction of the X-axis,
a second peak-to-peak value of a vibration at the turbine end of the rotor with respect to a direction of the Y-axis,
a third peak-to-peak value of a vibration at the collector end of the rotor with respect to the direction of the X-axis, and
a fourth peak-to-peak value of a vibration at the collector end of the rotor with respect to the direction of the Y-axis.

12. The method according to claim 11, wherein, in the step of calculating the multivariate management indexes, the Hotelling's T-squared value is calculated using a deviation between an average value of the first to fourth peak-to-peak values in a specific time section and an average value of the first to the fourth peak-to-peak values in an entire time section.

13. The method according to claim 11, wherein, in the step of extracting the operation index, at least one of the Hotelling's T-squared value, the first to fourth peak-to-peak values, and an operation index value over time is displayed on a display unit.

14. The method according to claim 10, wherein the one or more operation indexes include at least one of a temperature of a thrust bearing pad metal, a temperature of a stator gas, and a voltage, a current, a power factor, an output voltage, and reactive power of a generator.

15. The method according to claim 10, wherein, in the step of extracting the operation index, the operation index causing the abnormality in the vibration characteristics is extracted by comparing correlation analysis coefficients with a reference coefficient, the correlation analysis coefficients being extracted by performing an correlation analysis on the Hotelling's T-squared value and the a plurality of operation indexes.

16. The method according to claim 11, further comprising the step of calculating the first to fourth peak-to-peak values according to the number of rotations of the rotor.

17. The method according to claim 11, wherein, in the step of determining the abnormality, detecting an abnormal vibration in the rotor when at least one of the first to fourth peak-to-peak values exceeds a threshold value.

18. The method according to claim 10, wherein, in the step of extracting the operation index, extracting correlation analysis coefficients by performing a correlation analysis on the Hotelling's T-squared value and the a plurality of operation indexes.

* * * * *